(12) United States Patent
Seibel et al.

(10) Patent No.: US 12,466,536 B2
(45) Date of Patent: Nov. 11, 2025

(54) AIRCRAFT STAIR SYSTEM USING BUMPER ARRANGEMENT

(71) Applicant: Textron Aviation Inc., Wichita, KS (US)

(72) Inventors: Michael John Seibel, Wichita, KS (US); Jamie L. Taber, Wichita, KS (US); Sidney Aloysius Mohr, Clearwater, KS (US)

(73) Assignee: Textron Innovations Inc., Providence, RI (US)

( * ) Notice: Subject to any disclaimer, the term of this patent is extended or adjusted under 35 U.S.C. 154(b) by 478 days.

(21) Appl. No.: 18/163,762

(22) Filed: Feb. 2, 2023

(65) Prior Publication Data

US 2023/0242255 A1 Aug. 3, 2023

Related U.S. Application Data

(60) Provisional application No. 63/305,806, filed on Feb. 2, 2022.

(51) Int. Cl.
*B64C 1/24* (2006.01)
*A47B 5/04* (2006.01)
*A47B 31/06* (2006.01)
*B64D 9/00* (2006.01)
*H01F 7/02* (2006.01)

(52) U.S. Cl.
CPC ............... *B64C 1/24* (2013.01); *A47B 5/04* (2013.01); *A47B 31/06* (2013.01); *B64D 9/00* (2013.01); *H01F 7/0252* (2013.01)

(58) Field of Classification Search
CPC . B64C 1/24; B61D 23/02; E04F 11/04; E04F 11/06; E04F 11/062
See application file for complete search history.

(56) References Cited

U.S. PATENT DOCUMENTS

| | | |
|---|---|---|
| 1,149,078 A | 8/1915 | Otte |
| 2,119,143 A | 5/1938 | Tringale |
| 2,196,546 A | 4/1940 | Bowers |
| 2,493,639 A | 1/1950 | Pellegrini |
| 2,531,263 A | 11/1950 | Fink et al. |
| 2,813,293 A | 11/1957 | Civitelli |
| 2,910,255 A | 10/1959 | Johnson |
| 2,990,148 A | 6/1961 | Varnell |
| 2,990,802 A * | 7/1961 | Ong ............ B63B 59/02 293/120 |
| 3,047,093 A | 7/1962 | Cruz |
| 3,083,784 A | 4/1963 | Urian |
| 3,694,018 A | 9/1972 | Levering |
| 3,779,536 A * | 12/1973 | Lachmann ......... E02B 3/26 267/140 |
| 3,941,337 A * | 3/1976 | Molter ............. B64C 1/24 182/48 |
| 4,176,812 A * | 12/1979 | Baker ............. B64C 1/1407 244/129.5 |
| 4,756,266 A * | 7/1988 | Sakuraoka ........ F16F 1/422 267/140 |

(Continued)

*Primary Examiner* — David E Martinez
(74) *Attorney, Agent, or Firm* — Avek IP, LLC

(57) ABSTRACT

An aircraft stair system is provided with flexible bumpers configured to prevent abrupt impact of the first structure against the second. Each of the bumpers has a flexible body, a base portion, and a lever arm extending out over the base to create a gap and an open mouth.

18 Claims, 23 Drawing Sheets

(56) References Cited

U.S. PATENT DOCUMENTS

| | | | |
|---|---|---|---|
| 5,975,000 A * | 11/1999 | Nakamura | E02B 3/26 |
| | | | 405/215 |
| 5,988,609 A * | 11/1999 | Young | F16F 7/00 |
| | | | 267/140 |
| 6,233,872 B1 * | 5/2001 | Glagow | B60J 10/82 |
| | | | 49/27 |
| 7,669,797 B2 | 3/2010 | Yada et al. | |
| 8,210,508 B2 | 7/2012 | Hwang | |
| 8,359,716 B2 | 1/2013 | Fiedler | |
| 9,032,594 B1 | 5/2015 | Mitchell | |
| 9,593,699 B2 | 3/2017 | Giacalone et al. | |
| 10,085,521 B2 | 10/2018 | Chen et al. | |
| 10,143,270 B2 | 12/2018 | Fiedler et al. | |
| 10,458,169 B2 | 10/2019 | Kato | |
| 10,870,480 B2 | 12/2020 | Brakes | |
| 10,962,073 B2 * | 3/2021 | Muha | F16F 1/376 |
| 11,006,699 B1 | 5/2021 | Goodwin et al. | |
| 11,084,672 B2 | 8/2021 | Deslauriers | |
| 11,186,353 B2 * | 11/2021 | Savidge | B64C 1/24 |
| 11,245,223 B2 | 2/2022 | Hiller et al. | |
| 2003/0173444 A1 | 9/2003 | Coulter | |
| 2010/0064473 A1 | 3/2010 | Draney et al. | |
| 2015/0198955 A1 | 7/2015 | De La Bardonnie et al. | |
| 2017/0240015 A1 | 8/2017 | Im | |
| 2017/0297713 A1 | 10/2017 | Hegenbart et al. | |
| 2018/0319257 A1 * | 11/2018 | Krause | B60J 10/79 |
| 2019/0183423 A1 | 6/2019 | Radivojevic | |
| 2019/0225339 A1 | 7/2019 | Blauwhoff et al. | |
| 2020/0317320 A1 | 10/2020 | Gormley | |
| 2021/0339681 A1 | 11/2021 | McNea et al. | |
| 2022/0089008 A1 * | 3/2022 | Tooker | B60J 10/74 |

* cited by examiner

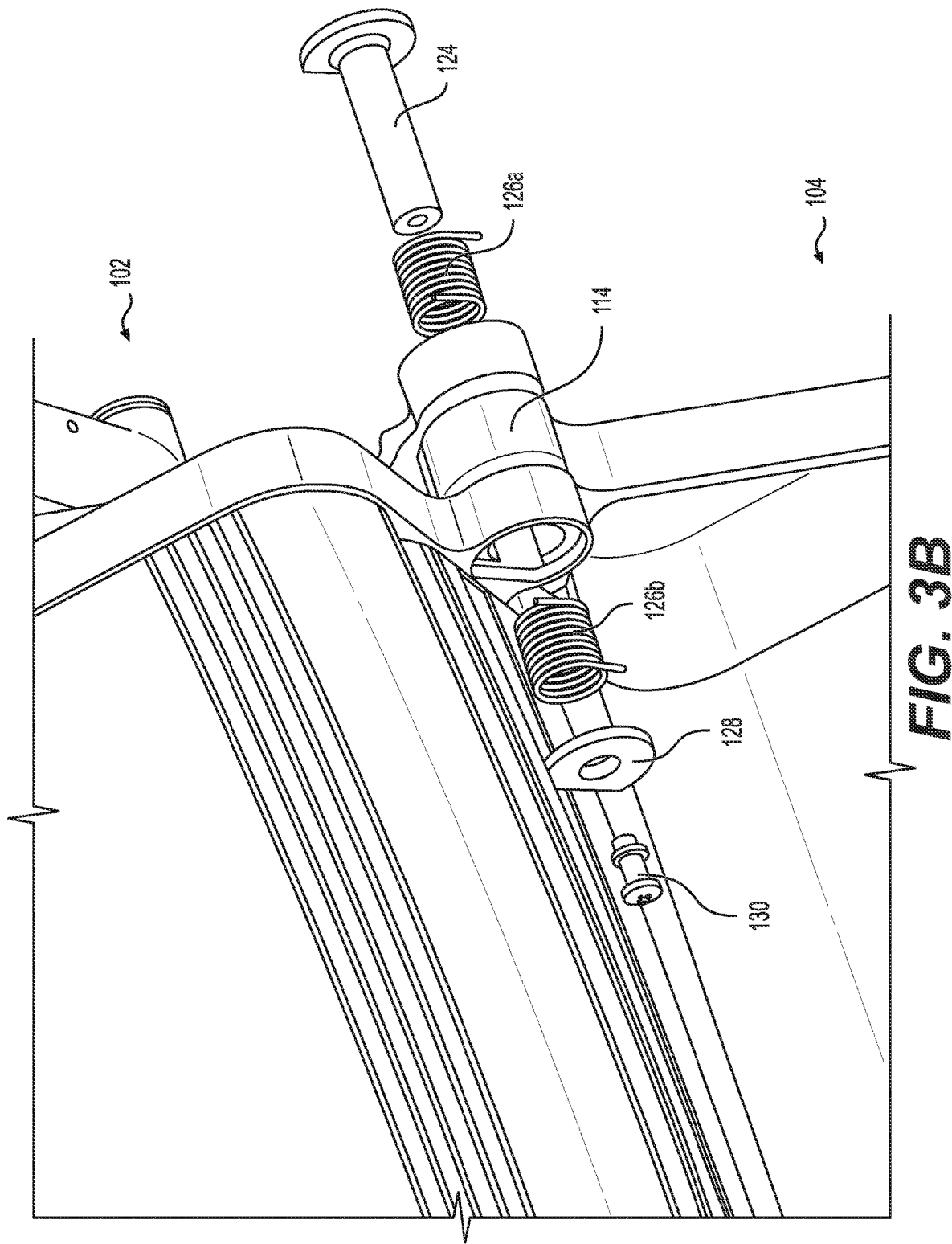

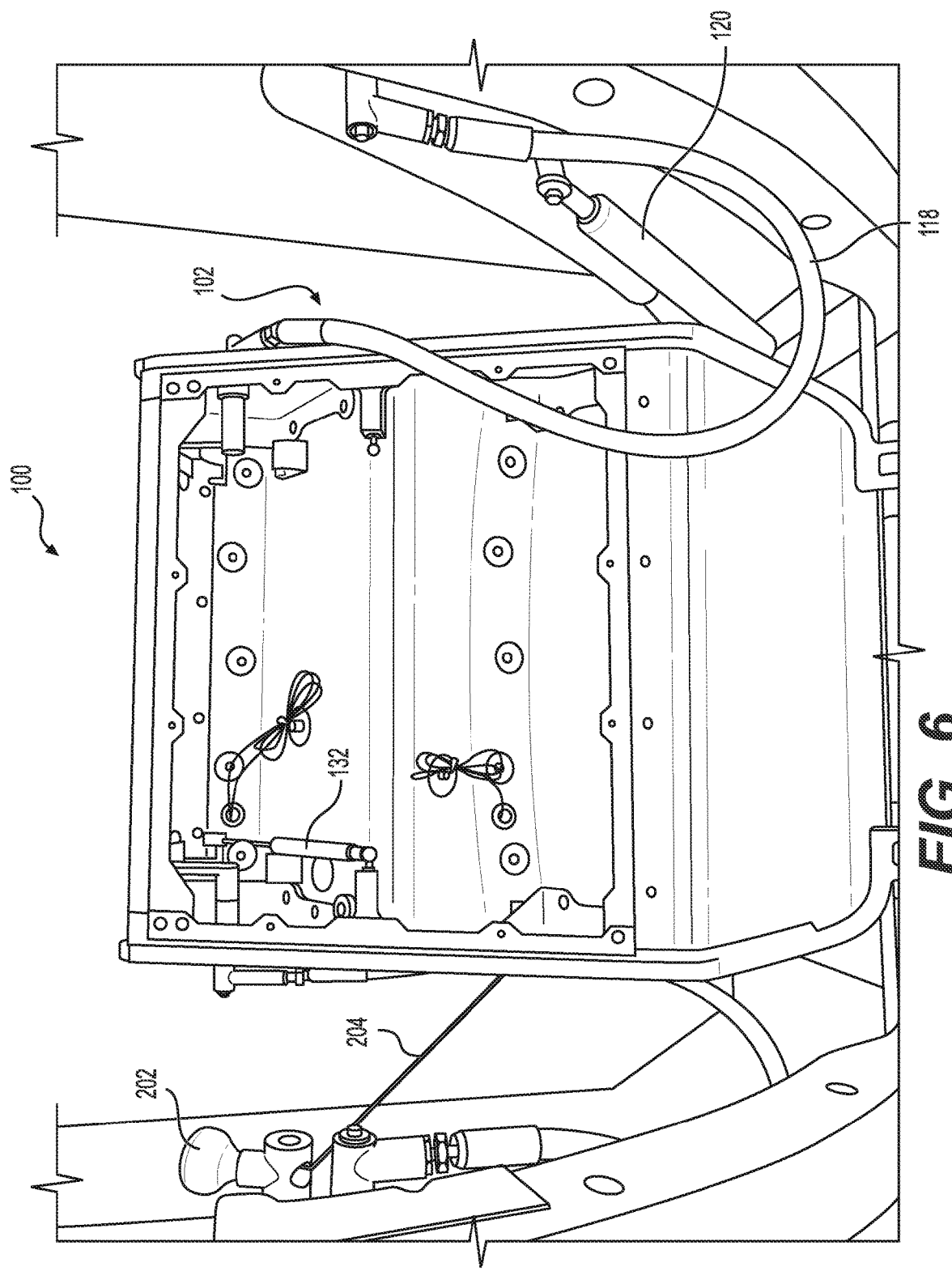

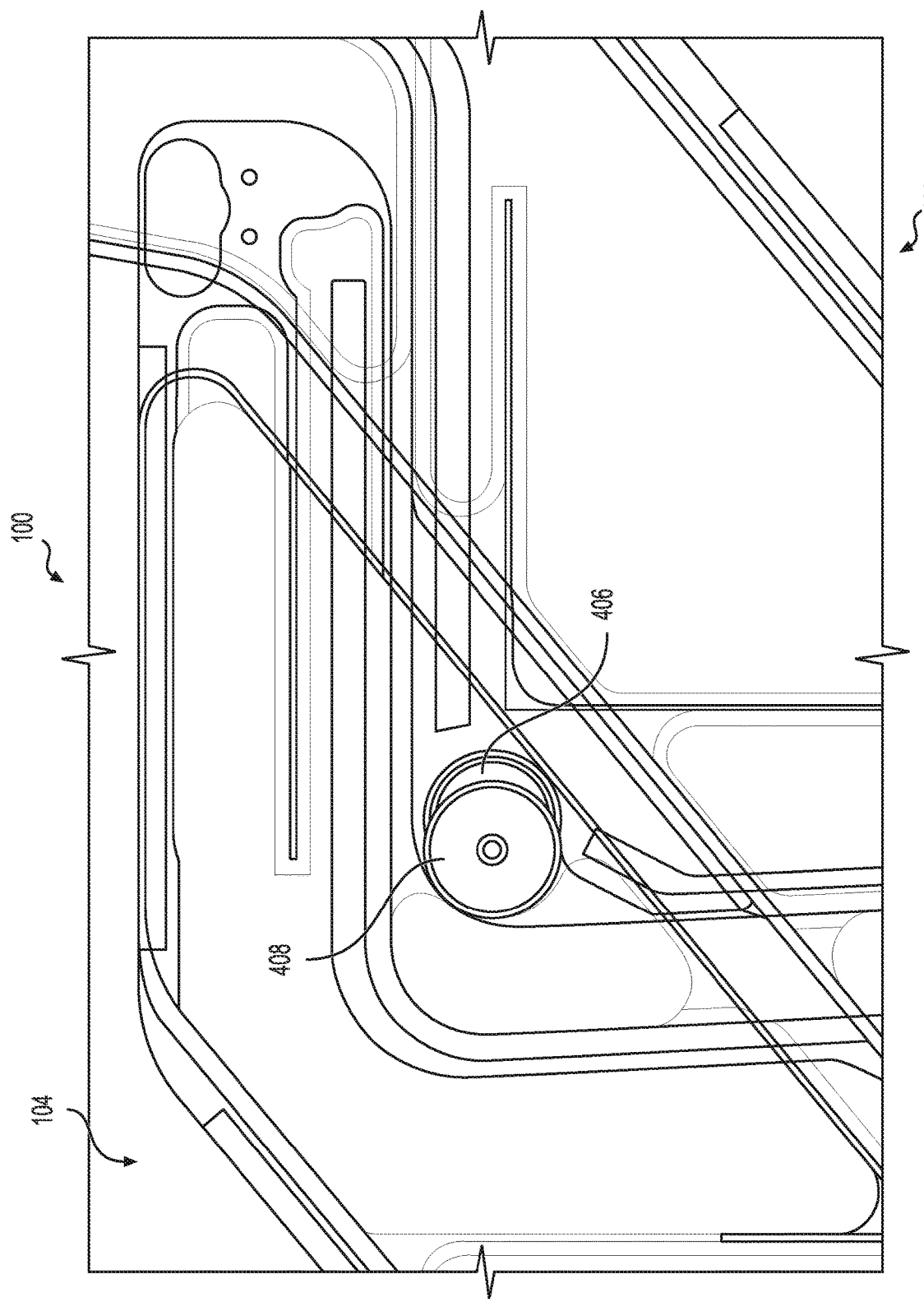

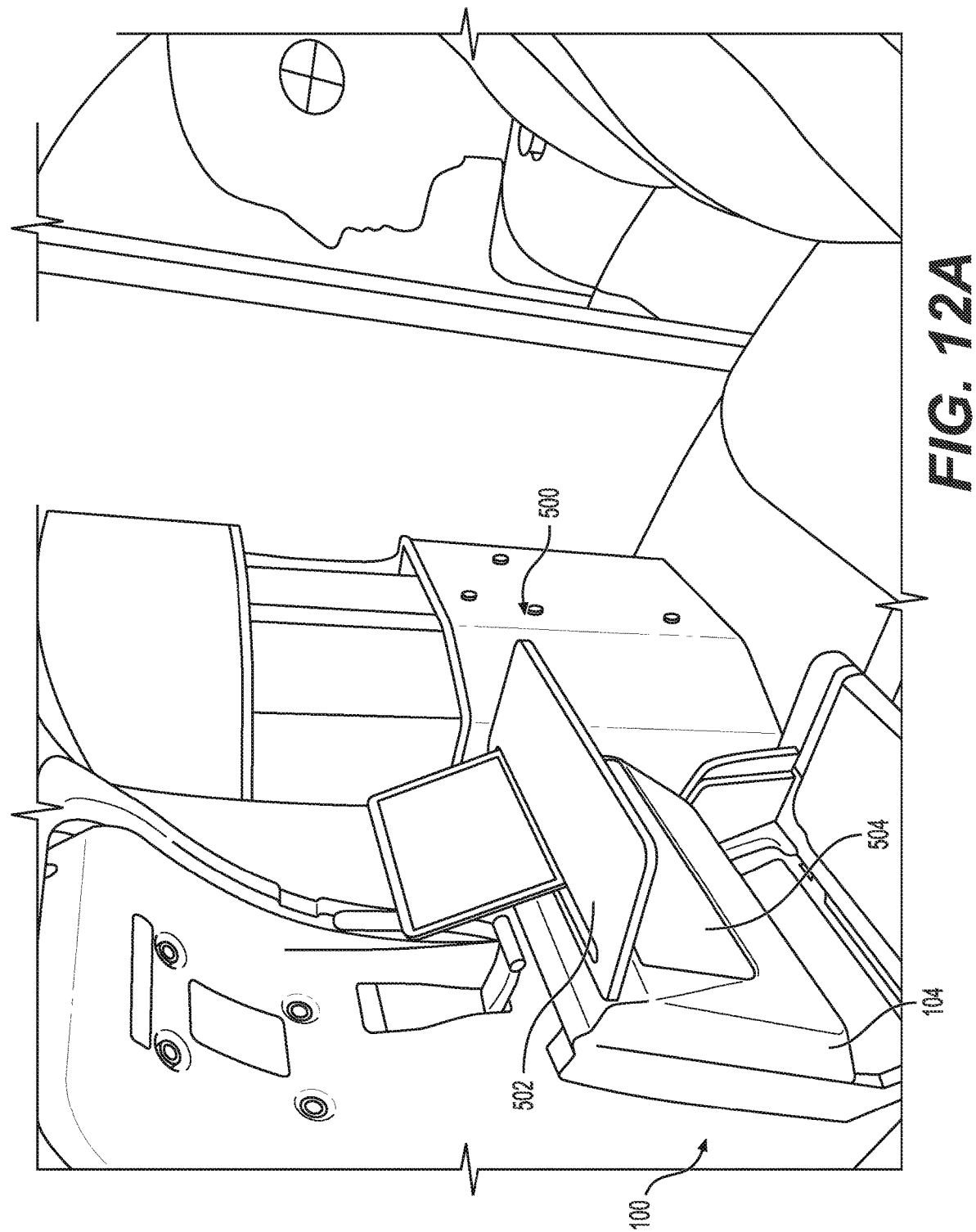

AIRCRAFT STAIR SYSTEM USING BUMPER ARRANGEMENT

CROSS-REFERENCE TO RELATED APPLICATIONS

This application claims the benefit of priority of U.S. Provisional Patent Application No. 63/305,806, filed on Feb. 2, 2022, the disclosure of which is herein incorporated by reference in its entirety.

BACKGROUND

1. Field

Embodiments of the invention relate generally to stowable stairways, and more specifically to folding stowable stairways on aircraft.

2. Related Art

Staircases which are deployable from inside an aircraft doorway are well known in the art. For example, U.S. Pat. No. 2,531,263 to Fink et al. discloses a retractable stairway on board an airplane fuselage. Fink discloses the stairway may comprise two principal portions which may be hinged together and foldable and a cable system which operates to deploy or close the stairway. A spring is used in Fink aid in the retraction of the stairway. U.S. Pat. No. 7,669,797 to Yada et al. discloses a foldable boarding ramp stored inside an aircraft. Yada discloses a driving pulley and cable, which may operatively deploy the boarding ramp.

It is also known in some areas of art to use rubber bumpers to dissipate the blow of converging objects. U.S. Pat. No. 5,988,609 to Young discloses a rubber stop member fastened to a movable element for engaging a relatively fixed member. U.S. Pat. No. 3,694,018 to Levering discloses a bumper configured to dissipate energy upon collision of a vehicle. Levering discloses the bumper includes dissipators located directly behind the bumper. U.S. Pat. No. 2,119,143 to Tringale discloses a door stop mounted on a doorjamb to engage the door as it approaches its closed position to prevent slamming of the door.

It is known in some areas of art to use magnetic systems to hold objects together. In the field of aircraft, U.S. Pat. No. 10,870,480 to Brakes discloses an aerodynamic structure that has a first magnetic sealing surface and a second magnetic sealing surface. U.S. Patent Application Publication No. 2017/0297713 to Hegenbart et al. discloses a coupling device in a vehicle body. Hegenbart discloses that the coupling device generates a magnetic field, such that the magnetic field holds the floor structure in a suspended state relative to the primary vehicle structure. Hegenbart discloses that the contactless mounting of the interior vehicle fittings to the primary vehicle structure dampens vibrations and noises associated with the vehicle body. U.S. Patent Application Publication No. 2019/0225339 to Blauwhoff et al. discloses a various restraint mechanisms for an object within a lower deck of an aircraft. U.S. Pat. No. 9,593,699 to Giacalone et al. discloses an aircraft that includes a fastener assembly having a movable stud which are magnetized.

Other publications of note using magnetic connections outside of aircraft include U.S. Patent Application Publication No. 2020/0235520 to Hiller et al. discloses a magnetic closing device, U.S. Pat. No. 9,032,594 to Mitchell disclosing a closing hook that includes magnetic materials. U.S. Pat. No. 8,359,716 to Fiedler discloses a locking device, mainly a buckle, that includes a magnet to aid in closing of the device. Additional prior art references regarding the use of magnets include U.S. Pat. No. 10,085,521 to Chen et al., U.S. Pat. No. 10,143,270 to Fiedler et al., U.S. Pat. No. 11,006,699 to Goodwin et al., and U.S. Patent Application Publication No. 2019/0183423 to Radivojevic.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In some aspects, the techniques described herein relate to a stairway for an aircraft, including: a first portion of the stairway having one or more steps on a stair side of the first portion, the first portion being hingeably connected to a doorway of the aircraft at a first end of the first portion; a second portion of the stairway having a first end which is hinged to the second end of the first portion, the second portion having one or more steps in a stair side of the second portion; a plurality of mechanical resistance mechanisms incorporated to decelerate relative motion between both (i) the first portion relative to the doorway, and (ii) the first portion relative to the second portion.

In some aspects, the techniques described herein relate to a stairway, wherein when stowed, the first half and the second half are configured to include a nested configuration wherein the first plurality of steps fit together with the second plurality of steps.

In some aspects, the techniques described herein relate to a stairway wherein the first plurality of steps and the second plurality of steps nearly abut when stowed.

In some aspects, the techniques described herein relate to a stairway, wherein in the nested configuration, the one or more stairs are concealed from view.

In some aspects, the techniques described herein relate to a stairway, wherein when stowed the first and second portions together are substantially parallel one to the other.

In some aspects, the techniques described herein relate to a stairway, wherein the sides of the first and second portions which do not include steps and are exposed when the stairs are stowed are substantially flat.

In some aspects, the techniques described herein relate to a stairway wherein a retracting mechanism is operatively connected to the second portion of the stairs, and the retracting mechanism is configured to allow a user to deploy or stow the stairway.

In some aspects, the techniques described herein relate to a stairway wherein the retracting mechanism includes an actuating knob which is operatively connected to a reel by a wire, and when the knob is pulled the reel is released which pulls the second portion atop the first portion.

In some aspects, the techniques described herein relate to a stairway wherein the reel mechanism is a clock spring system.

In some aspects, the techniques described herein relate to a stairway including: a front cable and an aft cable, both attached to the aircraft above the stairs, and connected to opposite sides laterally of the first portion proximate a hinge that connects the first portion to the second portion.

In some aspects, the techniques described herein relate to a stairway wherein the plurality of mechanical resistance mechanisms includes: a primary damper attached between a location on the aircraft above the stairs and suspended to be attached to an upper location on the first half of the stairs, the primary damper biasing the stairs towards a stowed configuration.

In some aspects, the techniques described herein relate to a stairway wherein the primary damper is one of a spring strut, a gas strut, or a hydraulic damper.

In some aspects, the techniques described herein relate to a stairway wherein the plurality of mechanical resistance mechanisms includes: includes one or more secondary dampers disposed on a backside of first portion to damp during deployment and in stowing of the stairway.

In some aspects, the techniques described herein relate to a stairway wherein the one or more secondary dampers are biased in an extended configuration to provide resistance against the rotation of second portion relative to the first portion of the stairs.

In some aspects, the techniques described herein relate to a stairway wherein the one or more secondary dampers are any of a spring strut, a gas strut, or a hydraulic damper. a spring strut, gas strut, or hydraulic damper.

In some aspects, the techniques described herein relate to a stairway wherein the first portion is hingeably connected to the second portion by a hinge system, the hinge system including a biasing arrangement which biases the second portion to rotate upwards and over the first portion when the stairway is deployed.

In some aspects, the techniques described herein relate to a stairway wherein the biasing arrangement includes at least one torsion spring mounted about the hinge and configured to create the bias of the second portion to rotate upwards and over the first portion.

In some aspects, the techniques described herein relate to a aircraft stair arrangement for a doorway, the arrangement including: a first portion of stairs hinged at a proximate end to the doorway; a second portion of stairs hinged to a distal end of the first portion of stairs; a step side of the first portion being nestable into a step side of the second portion when the second portion is rotated onto the first portion; a mechanical resistance system incorporated to damp the deployment of the first and second portions from the doorway.

In some aspects, the techniques described herein relate to a stairway wherein a user actuatable retracting mechanism is operatively connected between the aircraft and the second portion of the stairs, and the retracting mechanism is configured to allow a user to deploy or stow the stairway.

In some aspects, the techniques described herein relate to a stairway wherein the mechanical resistance system includes a first damping arrangement between the doorway and the first portion, and a second damping arrangement between the second portion and the first portion. In some aspects, the techniques described herein relate to a system configured to prevent abrupt collapse of first structure against a second structure around a rotational axis including: a bumper having an at least partially flexible body; the body having a base portion attached to the first structure; the body having a linking portion rising up from a rear of the base portion; the body having a lever portion extending forwardly from the linking portion; and a gap disposed between an underside of the lever portion and the base portion, the gap being configured to at least partially close upon a contact received from the second structure onto an upper surface of the lever portion.

In some aspects, the techniques described herein relate to a system including: an upper surface atop the base portion which together with the undersurface of the lever portion creates an engagement profile that becomes larger upon the abrupt collapse of the first and second structures.

In some aspects, the techniques described herein relate to a system wherein the upper surface atop the base portion is arcuate.

In some aspects, the techniques described herein relate to a system wherein the lever portion extends forward from the linking portion towards a free end towards a mouth defined between the lever portion and the linking portion.

In some aspects, the techniques described herein relate to a system wherein the engagement profile is configured to create a gradually-increasing angular resistance which prevents the abrupt impact between the first and second structures.

In some aspects, the techniques described herein relate to a system wherein the axis of rotation is established by a hinge between the first and second structures and the bumper is attached to the first structure at a location proximate the hinge in an area onto which the second structure would otherwise impact.

In some aspects, the techniques described herein relate to a system wherein the first and second structures are independent portions of a foldable stairway.

In some aspects, the techniques described herein relate to a system wherein the foldable stairway exists in a doorway of an aircraft.

In some aspects, the techniques described herein relate to a system including an additional symmetrical bumper is mounted on an opposite side of the stairway from the bumper and is oriented in a substantially symmetrical manner.

In some aspects, the techniques described herein relate to a system wherein the first structure is an upper portion of the stairway having a first set of steps on a side the upper portion and the second structure is a lower portion of the stairway having a second set of steps on a side of the lower portion, the side of the lower portion including a second set of steps being rotatable upward to collapse onto the side of the upper portion.

In some aspects, the techniques described herein relate to a system wherein the base portion is connected to the first structure using a chemical adhesive.

In some aspects, the techniques described herein relate to a system wherein the height of the linkage portion is configured based on a weight of the second structure.

In some aspects, the techniques described herein relate to a system wherein the height of the linkage portion is configured based on a rotational force generated by a collapse of the second structure against the first structure.

In some aspects, the techniques described herein relate to a system wherein an angling of the lever portion relative to the base is configured to create a desired level of deceleration upon an engagement between the second structure and an upper surface of the lever portion.

In some aspects, the techniques described herein relate to a system wherein the body is configured such that the gap disposed between the underside of the lever portion and the base portion is configured to greatly decelerate the second structure when the gap is substantially closed upon a contact received from the second structure onto an upper surface of the lever portion.

In some aspects, the techniques described herein relate to a system wherein the lever portion includes downwardly-extending upper lip atop a mouth that is established between a forward end of the lever portion and a forward end of the base.

In some aspects, the techniques described herein relate to a system wherein an eye having a substantially rounded shape is established between the lever portion, the linking portion, and a rear of the base portion.

In some aspects, the techniques described herein relate to a system wherein the eye establishes an approximate hinge axis for the lever portion relative to the base portion.

In some aspects, the techniques described herein relate to a system wherein an arcuate shape of the upper surface of the base is configured to engage the arcuate shape of an internal roof surface underneath the lever, and that a radius of curvature of the upper surface of the base cooperates with the internal roof surface of the lever portion creating gradually increasing resistance force against a force applied by the second structure.

In some aspects, the techniques described herein relate to a system wherein the body is made of an elastomeric composition.

In some aspects, the techniques described herein relate to a system for securing a first object and a second object, the system including: a first magnet on an abutting face of the first object; a second magnet on an abutting face of the second object; a hinge by which one or more of the first object and the second object rotate relative to the other; a relative position established between the first and second magnets when first and second objects are in a secured mode, the relative position established between the first and second magnets creating a desired holding strength.

In some aspects, the techniques described herein relate to a system wherein the first and second magnets are circular.

In some aspects, the techniques described herein relate to a system wherein the first and second magnets are oval.

In some aspects, the techniques described herein relate to a system wherein the magnets nearly or directly contact another when the first object is in a secured configuration relative to the second object.

In some aspects, the techniques described herein relate to a system wherein the first and second magnets configured to have an extent of overlap required to meet a force required to hold the first object in position relative to the second object.

In some aspects, the techniques described herein relate to a system wherein each of the first and second magnets are included in recesses formed into each of the first and second abutting faces, respectively.

In some aspects, the techniques described herein relate to a system wherein each the first and second recesses formed into each of the first and second objects make the first and second magnets flush with each of the first and second abutment surfaces, respectively.

In some aspects, the techniques described herein relate to a system wherein an adjustment system exists for at least one of the first and second magnets, the adjustment system configured to create the relative positions of the first and second magnets.

In some aspects, the techniques described herein relate to a system wherein an adjustment system includes one or more pathways on which the first magnet slides to create the relative positions of the first and second magnets.

In some aspects, the techniques described herein relate to a system wherein the pathways include channels on which the first magnet can slide.

In some aspects, the techniques described herein relate to a system wherein a linker mounted on a side of the first magnet is configured to be received within the channels enabling slidable adjustment.

In some aspects, the techniques described herein relate to a system wherein the linker includes a fastening mechanism on a distal end of the linker, the fastening mechanism retaining the first magnet into the channels.

In some aspects, the techniques described herein relate to a system wherein an adjustment system includes one or more slots into which a linker on the first magnet is secured to create a position resulting in desired overlap with the second magnet.

In some aspects, the techniques described herein relate to a system wherein the relative positions of the first and second magnets are created by positioning the first magnet using one or more of snaps, Velcro®, suction, or additional magnets.

In some aspects, the techniques described herein relate to a system wherein the relative positions establish a degree of overlap between the first and second magnets.

In some aspects, the techniques described herein relate to a system wherein the relative positions establish an offset distance between the first and second magnets.

In some aspects, the techniques described herein relate to an aircraft stairway including: a first stairway portion pivotally mounted to an aircraft doorframe; a second stairway portion pivotally mounted below the and to the first stairway portion on a hinge arrangement; a first magnet on a surface of the first stairway portion; a second magnet on a surface of the second stairway portion abutting the surface on the first stairway portion; each of the first and second magnets configured to be at a distance from the hinge arrangement; and a relative position established between the first and second magnets when the second stairway portion is secured onto the first stairway portion, the relative position established between the first and second magnets creating a desired holding strength.

In some aspects, the techniques described herein relate to a system wherein the relative position is established by a degree of overlap between the first and second magnets.

In some aspects, the techniques described herein relate to a system wherein the relative positions establish an offset distance established between the first and second magnets.

In some aspects, the techniques described herein relate to a method of securing a first object to a second object, the method including: mounting a first magnet onto a surface on the first object; mounting a second magnet onto a surface on the second object, the surface on the first object abutting the surface on the second object; establishing a position of the second magnet relative to the first magnet such that a desired holding force is created by either a degree of offset, or an extent of overlap of the first and second magnets.

In some aspects, the techniques described herein relate to a system including: an aircraft staircase configured to be deployed from the doorway to the ground and stowed inside the aircraft interior; the staircase, when stowed, extending substantially upward and presenting an interior surface; a worktable configured to rotate outwards and upwards from the interior surface of the stowed staircase and be locked in a substantially horizontal position extending into the cabin for supporting articles.

In some aspects, the techniques described herein relate to a system including: an actuating mechanism configured to bias the worktable towards the open configuration; and a locking mechanism configured to maintain the worktable on the interior surface of the staircase.

In some aspects, the techniques described herein relate to a system wherein a button is operatively linked to the locking mechanism and configured to release the table allowing the worktable to rotate up into the substantially horizontal position.

In some aspects, the techniques described herein relate to a system wherein a storage space is revealed underneath the worktable when the worktable is rotated up into the substantially horizontal position.

In some aspects, the techniques described herein relate to a system wherein the staircase includes a first portion hinged to the doorway by a main hinge and a second portion hinged to the first portion by an intermediate hinge such that the second portion is able to fold over the first portion concealing a plurality of steps, and the interior surface of the stowed staircase includes a side of the second portion that is not folder over and does not contain steps.

In some aspects, the techniques described herein relate to a system including: a releasable locking mechanism maintaining the table to the interior surface; a deployment mechanism for compelling the worktable into the substantially horizontal position.

In some aspects, the techniques described herein relate to a system wherein the deployment mechanism is an actuating cylinder which biases the worktable to rotate upwards away from the interior surface of the staircase.

In some aspects, the techniques described herein relate to a system wherein the deployment mechanism is one of a gas strut, a spring strut, or hydraulic cylinder.

In some aspects, the techniques described herein relate to a system wherein the releasable locking mechanism engages a portion of worktable to lock the worktable a closed configuration until a user actuates a release button which causes the deployment mechanism to expand outward biasing the worktable upwards around a pivot until the worktable reaches the substantially horizontal deployed position.

In some aspects, the techniques described herein relate to a system including: a locking mechanism configured to lock the worktable in place when the deployment mechanism has deployed the worktable to the substantially horizontal position.

In some aspects, the techniques described herein relate to a system wherein one or more supports are operatively connected between a proximal end of the worktable and extend down to be connected to at least one position below the table on the interior surface of the staircase.

In some aspects, the techniques described herein relate to a system wherein the one or more supports include two portions which fold inwardly to exist between the worktable and interior surface when the worktable is in the closed configuration.

In some aspects, the techniques described herein relate to a system wherein the two portions include a sliding lock which holds the supports in an open position.

In some aspects, the techniques described herein relate to a system wherein the worktable includes internally biased mechanisms configured to bias the worktable into the substantially horizontal position.

In some aspects, the techniques described herein relate to a system wherein the internally biased mechanisms are torsional springs.

In some aspects, the techniques described herein relate to a system for an aircraft including: a staircase configured to be stowed inside the aircraft interior and presenting an interior surface facing the inside of a cabin of the aircraft; a table mounted into a doorway of the aircraft, the table configured to rotate outwards and upwards from the interior surface of the stowed staircase and be locked in a substantially horizontal position extending into the cabin for supporting articles.

In some aspects, the techniques described herein relate to a system wherein the staircase is a bifold staircase that is hingedly connected at the doorway and an intermediate position such that the bifold staircase can be collapsed to conceal a plurality of steps and retracted into the aircraft cabin to present the interior surface.

In some aspects, the techniques described herein relate to a system wherein the table includes an biasing system which compels the table from a first position substantially flush with the interior surface to a substantially horizontal position.

In some aspects, the techniques described herein relate to a system wherein the system includes a locking mechanism which releasably secures the table in the substantially horizontal position.

In some aspects, the techniques described herein relate to a system wherein the biasing system is one of a torsional spring or an actuator cylinder.

BRIEF DESCRIPTION OF THE DRAWING FIGURES

Embodiments of the invention are described in detail below with reference to the attached drawing figures, wherein:

FIGS. 3A-3B illustrate a hinge portion of the bifold airstair of FIG. 1, in some embodiments;

FIG. 6 shows a secondary damper of the bifold airstair of FIG. 1, in some embodiments;

FIGS. 9A-9C show the adjustable securing mechanism of the bifold airstair of FIG. 1, in some embodiments;

FIGS. 12A-12G show a tray table assembly in some embodiments.

Figure 1:
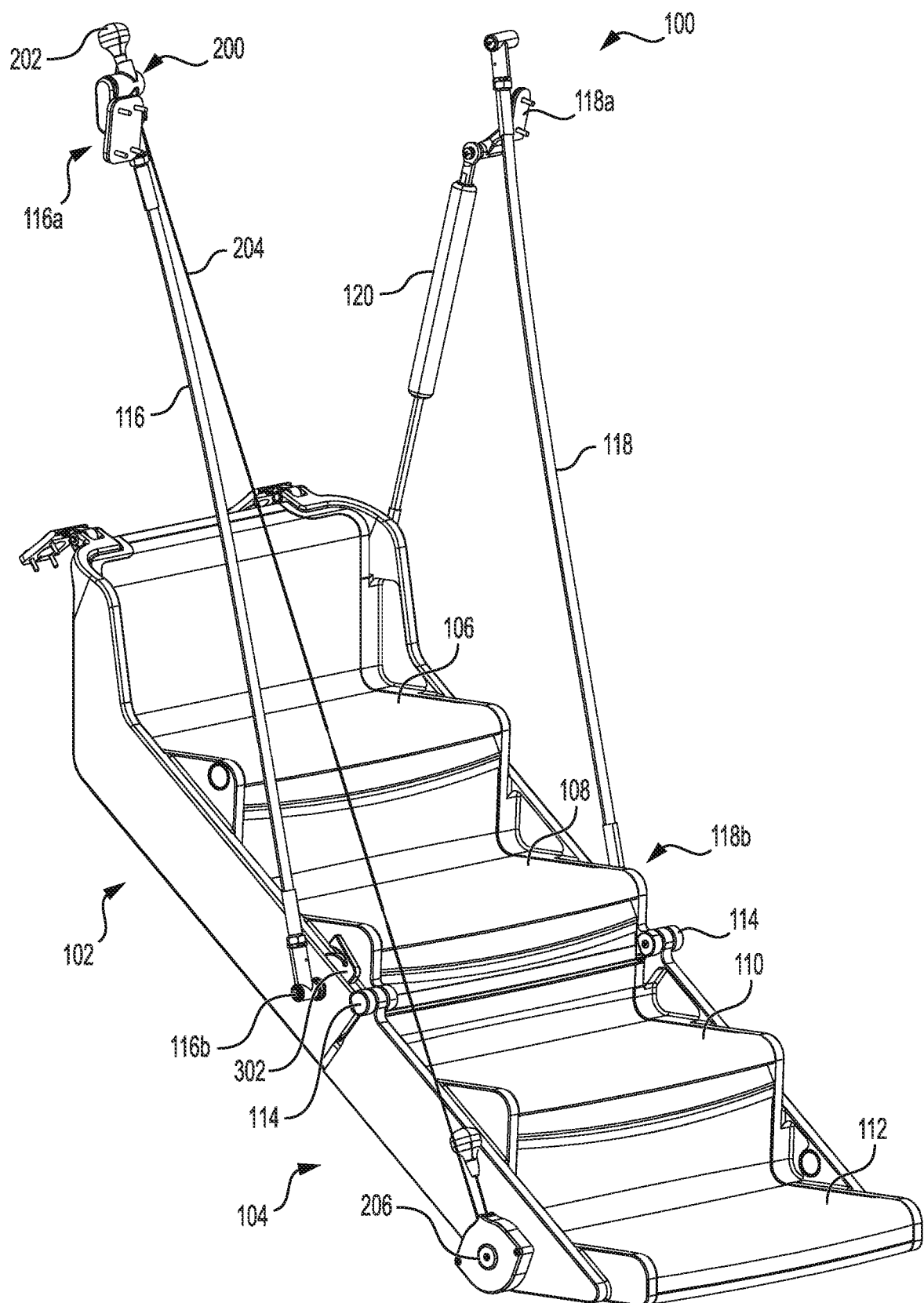
FIG. 1 shows an embodiment of a perspective view of a bifold airstair in the fully deployed configuration.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Some aircraft have a built-in set of stairs called an airstair that permits passengers to board or exit the aircraft. In many instances, these airstairs are mobile such that they have a deployed configuration for entrance or exit of passengers as well as a stowed configuration for flight (i.e., when the cabin doors are closed). Often, deploying or stowing the airstair may be burdensome for the user, as the airstair is typically heavy. Additionally, deploying or stowing the airstair may be clunky due to the lack of any assistive components for either process. Furthermore, some airstairs may require an individual outside of the aircraft to aid in stowing the airstair before closing the cabin door. Accordingly, improvements in airstairs are desirable.

In various embodiments, the systems disclosed herein aid in both deployment and stowing of airstairs. In some embodiments, components of the present airstair aid in protecting the mechanical integrity of the airstair by providing resistance mechanisms during the deployment phase to prevent slamming open of the airstair. In some embodiments, the airstair system disclosed herein aids in the stowing of the airstair by a user within the aircraft using certain components. In some embodiments, the airstair disclosed herein is configured to have one half fold against and into another half, therein decreasing the amount of occupied space within the fuselage of an aircraft in the stowed configuration. In some embodiments, the airstair disclosed herein is configured to remain securely in the stowed configuration via a securing mechanism.

FIG. 1 is a perspective view of a bifold airstair 100 in the fully deployed configuration. In some embodiments, bifold airstair 100 includes a first half 102 and a second half 104. First half 102 and second half 104, in some embodiments, include stairs disposed such that they cascade down at an angle from the aircraft. For example, first half 102 may include first stair 106 and second stair 108 and second half 104 may include third stair 110 and fourth stair 112. While not described, it is contemplated that first half 102 and second half 104 may comprise any number of stairs (e.g., one stair on each half, three stairs on each half, four stairs on each half, etc.). For example, bifold airstair 100 may be configured to accommodate different aircraft comprising different heights. Accordingly, bifold airstair 100 may be configured for different sized aircraft by including different numbers of stairs. Similarly, the sizes of each stair, and therefore the size of bifold airstair 100, may be adjusted according to the size of the aircraft.

Bifold airstair 100 may further include hinge 114, which is configured to provide a rotational point on which second half 104 rotates around, thereby enabling second half 104 to pivot upward in relation to first half 102 thus collapsing the second half 104 onto the first half 102. Hinge 114 is discussed in greater detail below with reference to FIGS. 3A-3B. In some embodiments, bifold airstair 100 includes a front cable 116 and an aft cable 118. Both front cable 116 and aft cable 118 include an aircraft attachment 116a, 118a, and an airstair attachment 116b, 118b. Front cable 116 and aft cable 118, in some embodiments, are configured to support the weight of bifold airstair 100 and potential passengers who may enter or exit the aircraft via bifold airstair 100.

Bifold airstair 100, in some embodiments, includes components that both ease the deployment of bifold airstair 100 as well as aid in stowing bifold airstair 100. In embodiments, a plurality of mechanical resistance mechanisms are incorporated into the stairway configuration to decelerate relative motion between both (i) the first half of the stairway 102 relative to the doorway, and (ii) the second half of the stairway 104 and the first half of the stairway 102. For example, in one aspect of the mechanical resistance system, a primary damper 120 may be configured to attach to first half 102 wherein it may bias the stairs in a closed configuration. Primary damper 120 will be discussed in greater detail below with reference to FIG. 2.

Bifold airstair 100, in some embodiments, includes a reel mechanism 200. Reel mechanism 200 may include a knob 202 operatively connected to a spool 206 via a wire 204. Reel mechanism 200 may be operated by a user to facilitate both deployment of and stowing of bifold airstair 100, which will be discussed in greater detail below with reference to FIGS. 5A-5B. Bifold airstair 100, in some embodiments, includes one or more secondary dampers 132 (see FIG. 6) disposed on the backside of first half 102. In some embodiments, secondary damper 132 (FIG. 6) is smaller than primary damper 120 (FIGS. 1, 2 and 6) and may aid in deployment of and stowing of bifold airstair 100.

Figure 2:
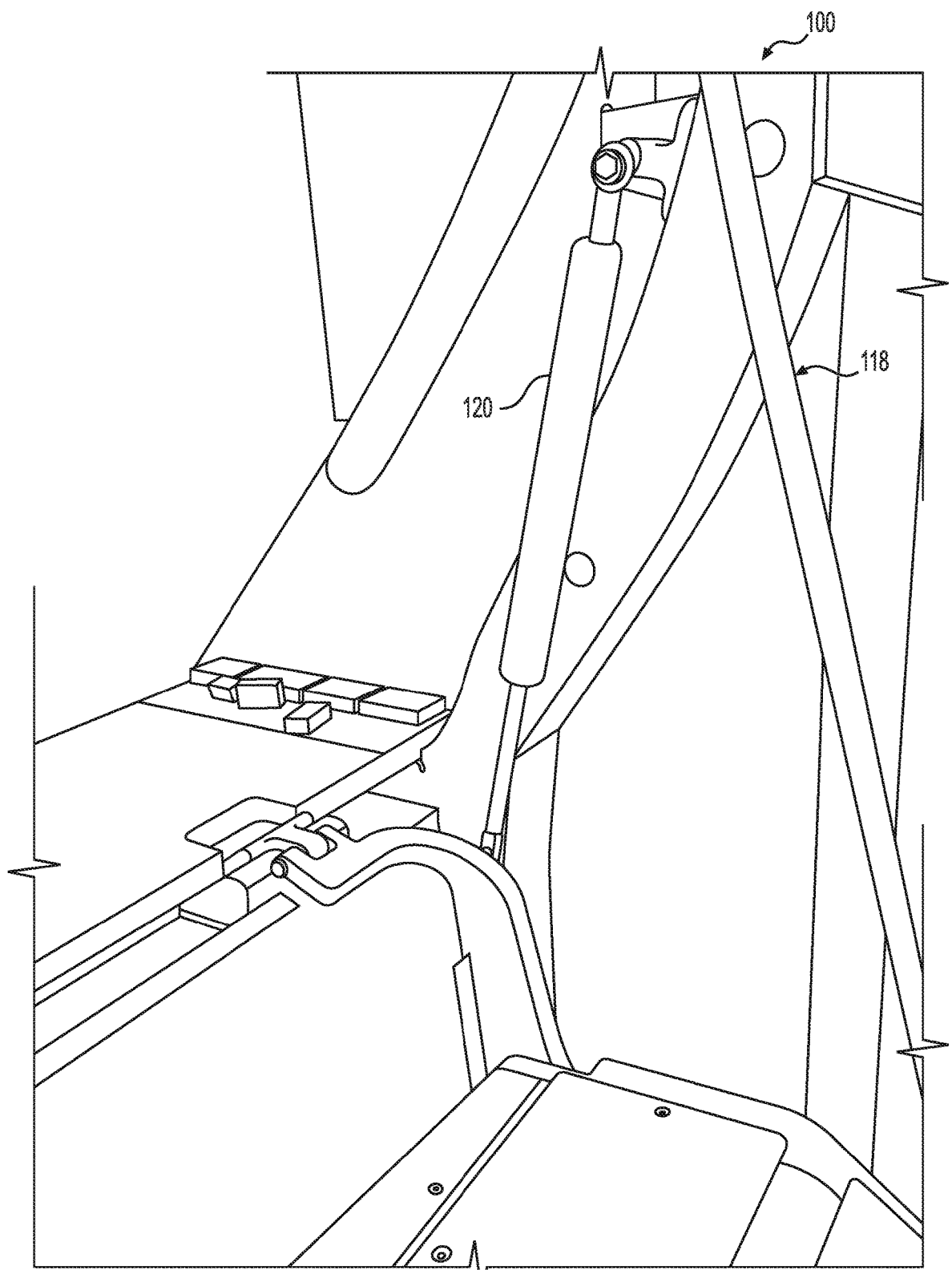
FIG. 2 depicts a primary damper of the bifold airstair of FIG. 1, in some embodiments.

FIG. 2 depicts the primary damper 120 of bifold airstair 100, in some embodiments. Primary damper 120 may be mechanically coupled to the fuselage of an aircraft on one end and operatively connected to the bifold airstair 100 on the other. In some embodiments, primary damper 120 is operatively connected to first half 102 of bifold airstair 100. In some embodiments, primary damper 120 is biased to rotate the stairs upward (e.g., biased to retract from the position shown in FIG. 1). Accordingly, primary damper 120 may bias first half 102 of bifold airstair 100 towards the fuselage of the aircraft. Biasing of primary damper 120 in a configuration to contract may ease the deployment of bifold airstair 100 by slowing the rotation of first half 102 around center axis A' (see FIG. 11A). Furthermore, biasing of primary damper 120 in the configuration may aid in stowing bifold airstair 100 by pulling first half 102 towards the fuselage of the airplane when, for example, a user actuates the reel mechanism 200, thereby initiating the stowing process. In some embodiments, primary damper 120 comprises a spring strut, a gas strut, or a hydraulic damper.

Figure 3A:
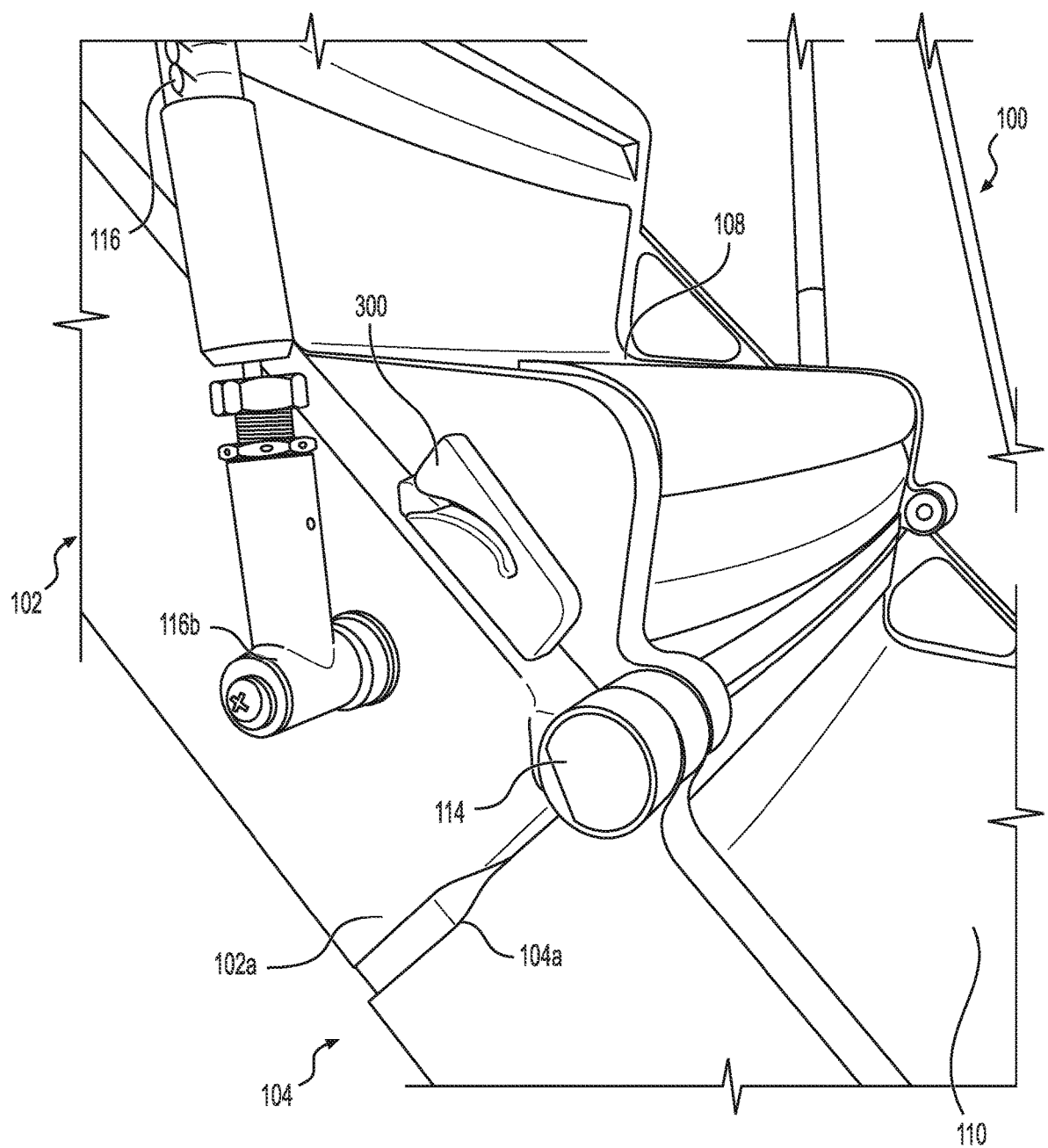

FIGS. 3A and 3B depict embodiments of hinge 114. Hinge 114 may be configured such that second half 104 rotates around hinge 114 and pivots with relation to first half 102, such that full rotation of second half 104 outward places bifold airstair 100 in the fully deployed configuration (i.e., wall 104a of second half 104 abuts wall 102a of first half 102). Turning to FIG. 3B, hinge 114 may comprise a spring mechanism that biases second half 104 rotationally towards first half 102 (i.e., resists torque of second half 104 swinging outwardly into the deployed configuration). In some embodiments, hinge 114 includes bolt 124 disposed therein. In some embodiments, bolt 124 operatively connects to springs 126a and 126b, and is received therethrough. In some embodiments, bolt 124 fastens at hinge 114 via washer 128 and fastener 130.

In some embodiments, springs 126a and 126b are torsion springs (e.g., helical torsion springs) configured to resist torque (i.e., rotational force) of second half 104 pivoting around hinge 114 in the outward, deployed direction. As such, springs 126a and 126b may ease the deployment of second half 104. Furthermore, in some embodiments, springs 126a and 126b aid in stowing of bifold airstair 100. For example, springs 126a and 126b may bias second half 104 upward around hinge 114 towards first half 102 (i.e., in the stowed direction). As such, in some embodiments, upon initiation of stowing bifold airstair 100 (e.g., via actuation of reel mechanism 200), springs 126a and 126b provide torque on second half 104 thereby aiding the user in actuating the bifold airstair 100 to the stowed configuration. Although only one hinge is pictured here, in some embodiments, hinge 114 is disposed on opposing sides of bifold airstair 100 (i.e., there are two hinges 114).

Bumpers

Figure 4A:
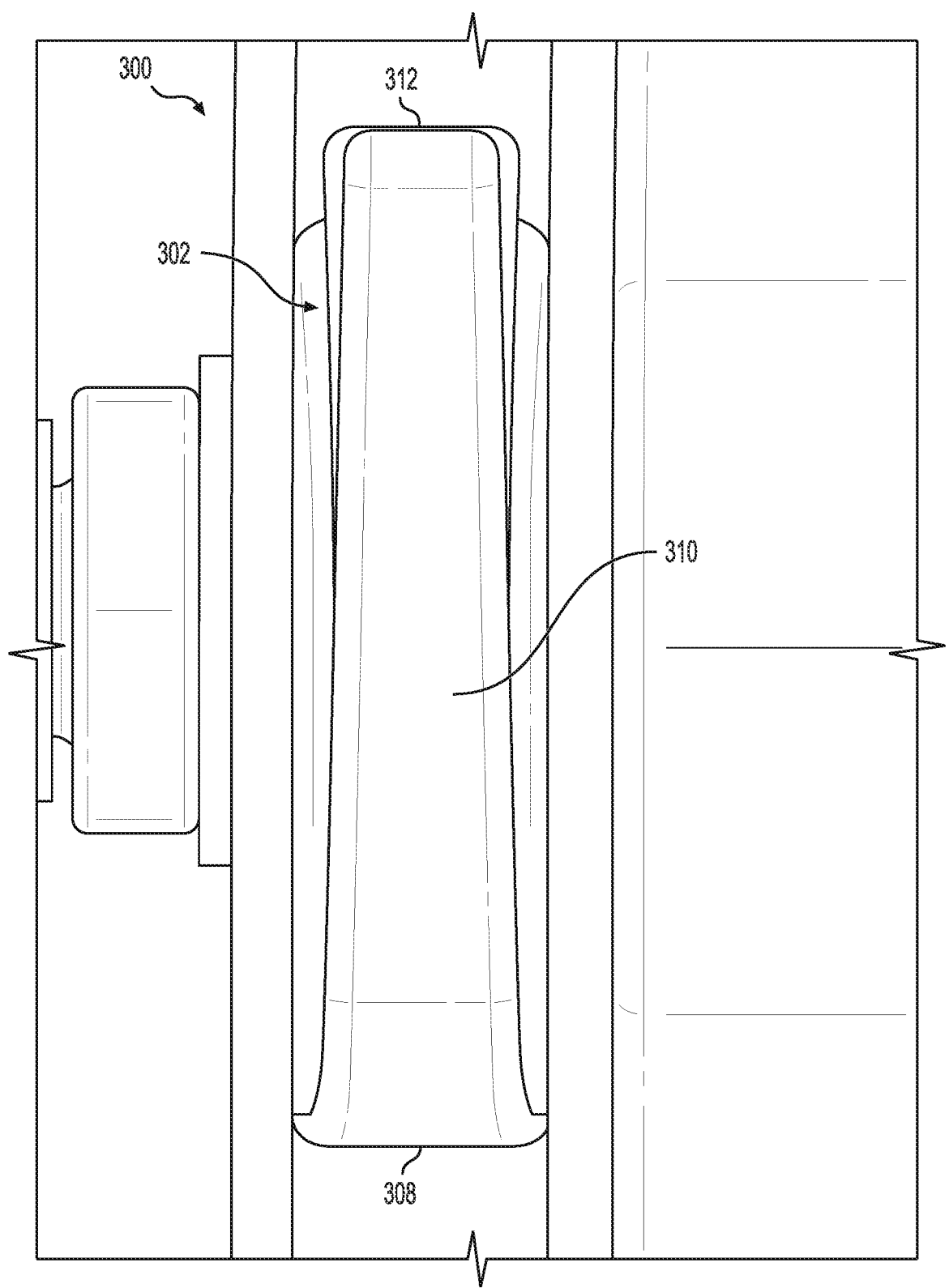
FIG. 4A is a front perspective illustrating a bumper, in some embodiments.
Figure 4B:
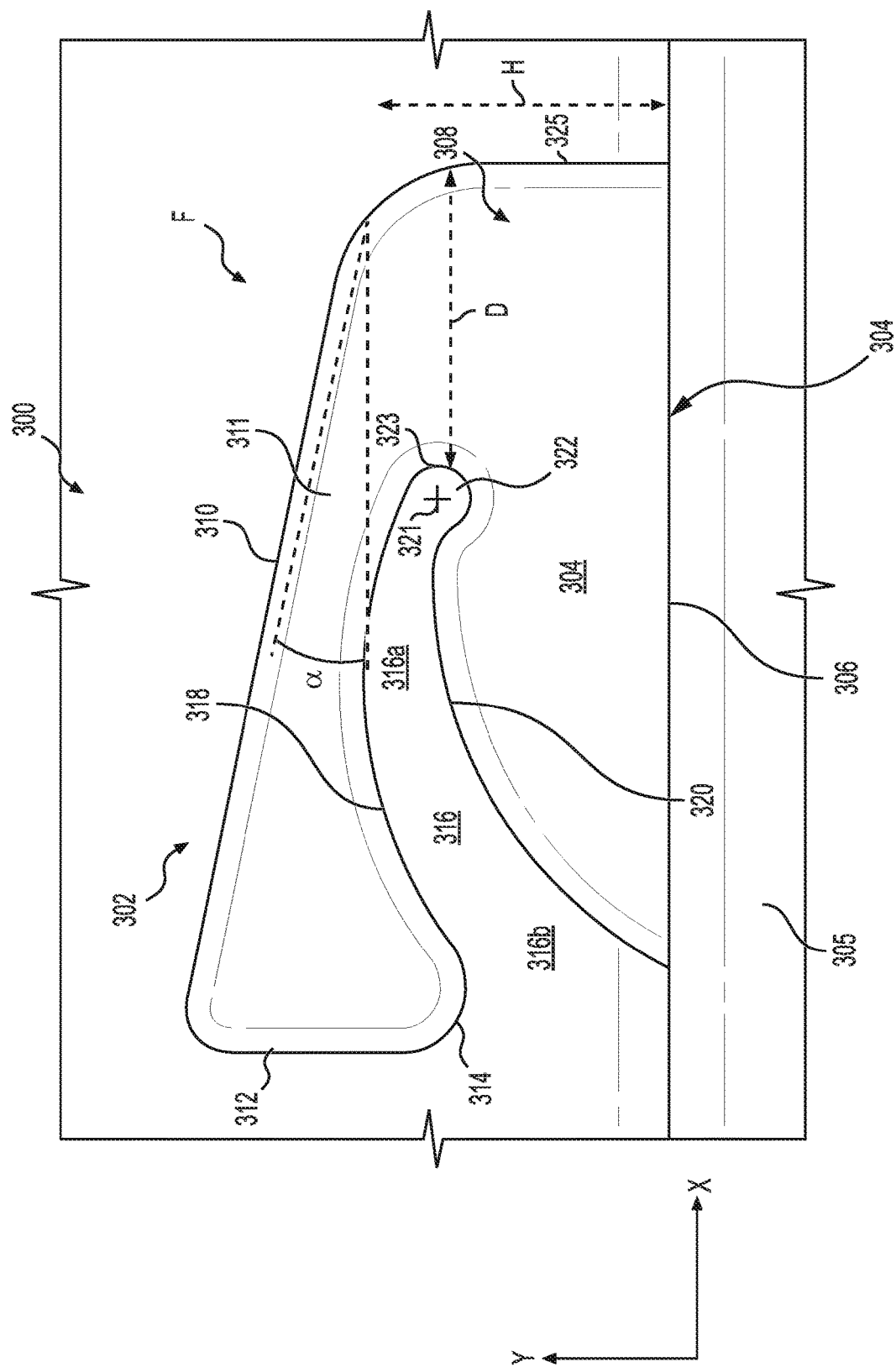
FIG. 4B is a side perspective illustrating the bumper, in some embodiments.
Figure 4C:
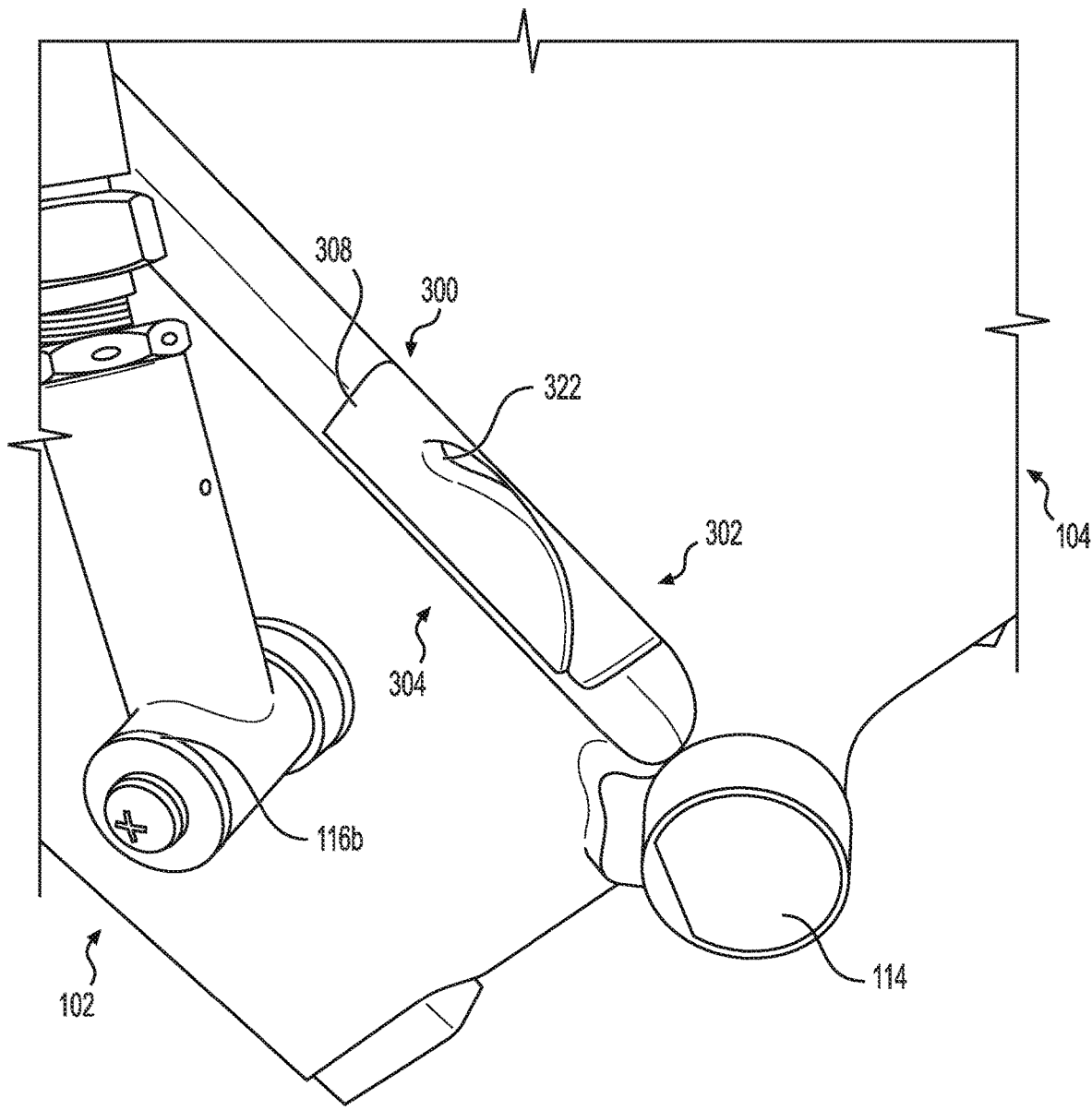
FIG. 4C is a side perspective illustrating the bumper in a compressed configuration, in some embodiments.

Referring now to FIGS. 4A-4C, a bumper 300 of some embodiments is illustrated. Bumper 300 is configured, in some embodiments, to prevent slamming shut of two objects around a pivotal axis. Bumper 300 may comprise a lever portion 302 and a base portion 304. Base portion 304 may be mechanically coupled to a first structure 305 of upper stair 102, using chemical adherence, tape, fastening mechanisms, etc. The attachment secures the floor 306 to an upper surface of the structure 305. In embodiments, attachment floor 306 may be configured to substantially contact the first structure. For example, as depicted attachment wall 306 is substantially straight as is contact surface on the first structure that bumper 300 is connected to. In other examples, if the contact surface on the first object were curved, angled, etc. then attachment wall 306 may be curved, angled, etc., respectively.

Bumper 300 may further comprise a linkage portion 308 which transitions up from the attachment floor 306, and then transitions forwardly to an upper engagement part 311 which supports an upper engagement surface 310. In embodiments, linkage portion 308 protrudes substantially upwards from the floor 306 at height H. The height H of linkage portion 308 may be configured based on one or more factors of the second, contacting structure. For example, the height H may be configured based on the weight of the second structure, with the first (lower) stair 104 swinging direction F, the composition of the second structure, the profile of the second structure that contacts contact wall 310, the rotational force of the second structure around rotation direction F, etc. In a non-limiting example, the height H of linkage wall 308 may be greater in cases where the weight of the second structure is greater than in cases where the weight of the second structure is lesser.

In some embodiments, engagement surface 310 may extend at an angle α from attachment wall 306. The angle α may be configured based on one or more parameters of the second structure, or the connective qualities of the first structure to the second structure. For example, the angle α may be configured based on the weight of the second structure, the swinging direction angle F, the composition of the second structure, the profile of the corresponding surface on the lower stair 104 that is brought into engagement with surface 310, the rotational force of the second structure in angular direction F, etc. In a non-limiting example, the angle α may be between about zero degrees to about forty-five degrees for a heavy second structure. In this way, a greater angle α will help slow down the second structure after initial contact. In another non-limiting example, the angle α may be less than or equal to zero degrees for a light second structure. In this way, the lever portion 302 won't completely stop the second structure's movement without closing gap 316, and when gap 316 closes, the resistance against the movement of the lower stair 104 will be magnified.

Engaging surface 10 transitions into front wall 312 at its second end. In some embodiments, front wall 312 (which establishes a free end in the embodiment of FIGS. 4A-C) may be substantially vertical with a downwardly-extending upper lip 314 at the lower end of front surface 312. In these embodiments, the vertical composition of front surface 312 will substantially resist the force of the second structure once upper lip 314 comes into contact with the base portion 304 (i.e., the gap 316 is closed). In this manner, once the lever portion 302 has slowed the second structure (i.e., by acting as a resistive lever), the bumper 300 will increasingly slow down, and then substantially stop the movement of the lower stair 104 as it collapses against the upper stair 102 in a stair retraction. The resistive force against collapse is substantially higher once gap 316 is closed (see FIG. 4C).

As mentioned previously, bumper 300 further comprises a gap 316 separating the lever portion 302 from the base portion 304. Gap 316 is defined by an interior roof surface 318 which is (before a collapse) engages an upper engagement surface 320 atop base 304.

Gap 316 terminates at an inner eye portion 322, where roof of mouth 318 and the flexible but relatively stationary upper surface 320 of base 304 converge. In some embodiments, eye 322 may comprise a substantially rounded shape configured to allow rotation of lever portion 302 down into base portion 304, while providing some resistance. In some embodiments, eye 322 may comprise an approximate hinge axis 321 for the lever portion 302 relative to the base portion 304. In some embodiments, the arcuate shape of the engagement surface 320 defined by the base 304 is more outwardly pronounced than is the arcuate internal shape of the roof surface 318. More specifically, the radius of curvature of the surface 320 beginning immediately left of the eye 322 cooperates with the internal arcuate engagement surface of the roof surface 318, thereby creating gradually increasing resistance force against an applied force F. This allows for the contact interface between mobile wall 318 and stationary wall 320 to provide greater variable angular resistance force than could be established by more regular shapes, e.g., rectangular, rounded. These features also cause the angular velocity decrease created by engagement to increase less apbruptly.

In embodiments, a center axis 321 of eye 322 can approximately establish a rotational axis of rotation of the lever portion 302 about the linking portion 308. A distance D from the back wall 323 of the linkage portion 308 to in innermost surface 323 of the eye 322 can be used to substantially affect the resistance the upper surface 310 of the lever portion 302 establishes against the contacting surface on the opposing structure, e.g., the corresponding engagement surface on the lower stair 104. For example, a larger distance D will increase the rigidity of joint 322 therein requiring a greater force to compress lever portion 302 into base portion 304. Alternatively, a smaller distance D will decrease the rigidity of joint 322 therein allowing compression of the lever portion 302 into the base portion 304 at a lower force.

Gap 316 comprises a proximal gap 316a and a distal gap 316b. In some embodiments, the size of distal gap 316b (i.e., distance from mobile wall 318 to stationary wall 320) is greater than the size of proximal gap 316a. In yet further embodiments, a size of the gap established increases as you move from the proximal gap 316a (nearer the joint 322) towards the distal gap 316b. In embodiments, this gradual increase in displacement affords a desirable pattern of resistance-force increase as the contact wall 310 of the lever portion 302 is compressed downward. The size of proximal gap 316a may be between about 20% to about 95% the size of distal gap 316b. In some embodiments, the size of proximal gap 316a and distal gap 316b may be configured to allow for angle α to be about 0 degrees upon closing of gap 316 (e.g., due to contact with the second structure). Said another way, the size of gap 316 may allow for contact wall 310 to be substantially parallel with attachment floor 306 after being compressed by the second structure (see FIG. 4C).

It is noted that FIGS. 4A and 4B depict some embodiments in which the rotational force F of the second object has a rotational axis directed towards the end of top engagement surface 310 that is connected to and extends forward from linkage portion 308. In other embodiments, such as that depicted in FIG. 4C, bumper 300 may be oriented such that rotation of the second structure may be directed at the other end of bumper 300, such that the second structure first contacts the end of engagement surface 310 that is connected to the front wall 312. Said another way, in some embodiments the orientation of bumper 300 may be flipped around the x-axis (i.e., linkage portion 308 is located on the left side of FIG. 4B). Such an orientation would cause the club end 314 to substantially compress, and therefore close the gap 316, before the second structure compresses linking portion 308. While the orientation of the bumper 300 may be altered, the overall benefits of bumper 300 softening the impact of two collapsing structures can be accomplished.

The shape of one or more of the underside mouth roof 318 and the upper surface 320 of the base may be different in different embodiments. For example, in some embodiments, both the mouth roof 318 and the upper surface 320 may comprise a substantially rounded shape (as shown in FIG. 4B). For example, the roof 318 may be substantially concave while the surface 320 may be substantially convex, or vice versa. In some embodiments, both the under roof 318 and the base upper surface 320 may comprise opposing angled surfaces presenting substantially flat but skewed engagement faces. In the aforementioned embodiments, the roof undersurface 318 and the upper surface 320 of the base may be configured to substantially contact one another across most of their surface area upon the closing of gap 316 due to contact with the second structure (e.g., collapsing stair). Such a fit may prevent recoil of bumper 300 upon fully closing, preventing recoil of the second structure from the bumper 300.

In some alternative embodiments, one of the underoof 318 or engagement surface 320 may comprise different shapes. For example, in some embodiments underoof 318 may comprise a rounded shape (e.g., convex shape) while engagement surface 320 may comprise a substantially flat shape. In these embodiments, the surface area contact between the underoof 318 and engagement surface 320 may increase during the closing of gap 316. Such a configuration may further slow the closing of bumper 300 upon contact with the second structure. This may be useful in cases where the second structure is heavier.

In embodiments, bumper 300 may be used to reduce the impact of any variety of objects that come together in a rotational direction (e.g., around a hinge). For example, bumper 300 may prevent the slamming shut of doors against jams, tray tables, seats, luggage compartments, etc. Bumper 300, in embodiments, may comprise an elastomeric material, such as a rubber material. In some embodiments, bumper 300 may be placed on a surface of a first structure that is diagonal to the surface of a second structure that will abut the first structure. For example, often the fuselage of an aircraft is rounded such that any portion of the fuselage will be angled in comparison to a substantially vertical or substantially horizontal object onboard. Accordingly, the bumper 300 may be placed on the diagonal wall (e.g., fuselage wall) such that if an object or structure is forced up against the diagonal wall, bumper 300 may absorb the force of the impact, similarly preventing the angular slamming of the objects together.

Embodiments of bumper 300 provide substantial benefits over other possible bumpers. For example, if a substantially solid bumper were used instead, then the two structures will recoil off one another as there is no mechanism to initially soften the contact between the two objects. In another example, a hollow bumper with both sides enclosed is not configured to properly damp a second structure at a rotational axis. Such bumpers are specifically configured to dampen the impact of objects colliding generally straight on. For example, U.S. Pat. No. 5,988,609 to Young and U.S. Pat. No. 3,694,018 to Levering disclose stoppers with a cavity enclosed by two sides. Both stoppers are configured to dissipate energy from objects impacting one another generally straight on. Bumper 300, by including lever portion 302, advantageously dissipates energy of objects impacting around a rotational angle. In some embodiments, the particular shape of the bumper 300 establishes this energy dissipation in a gradually increasing manner.

Referring back to FIG. 3A, bumper 300 is illustrated as a component of bifold airstair 100, but would be useful in numerous environments in which one member is collapsed on another and it is advantageous to avoid abrupt impact. In the disclosed embodiment, bumper 300 is configured to lessen the impact of second half 104 against first half 102 during stowing of bifold airstair 100. For example, during stowing of bifold airstair 100, bumper 300 may interact with a portion of second half 104 before it comes into contact with first half 102 when rotating inwardly around hinge 114. In these embodiments, bumper 300 may soften the closing of second half 104 against first half 102 and prevent the two halves from slamming against one another. For example, lever portion 302 may first come into contact with second half 104. Such contact may soften the closing of second half 104 against first half 102 by the closing of gap 316 and resistance of lever portion 302. Furthermore, once gap 316 is fully closed, the elastomeric composition of bumper 300 will substantially slow down further movement of second half 104 (see FIG. 4C). Accordingly, bumper 300 both softens the impact of the second half 104 against the first half 102 as well as substantially preventing recoil of the second half 104 off of the first half 102. While bumper 300 is depicted as disposed on first half 102, it is contemplated that bumper 300 may be disposed on second half 104 with a reverse-oriented arrangement. As noted above, the orientation of bumper 300 may be flipped such that lever portion 302 is directed towards or away from second half 104.

Reel

Figure 5A:
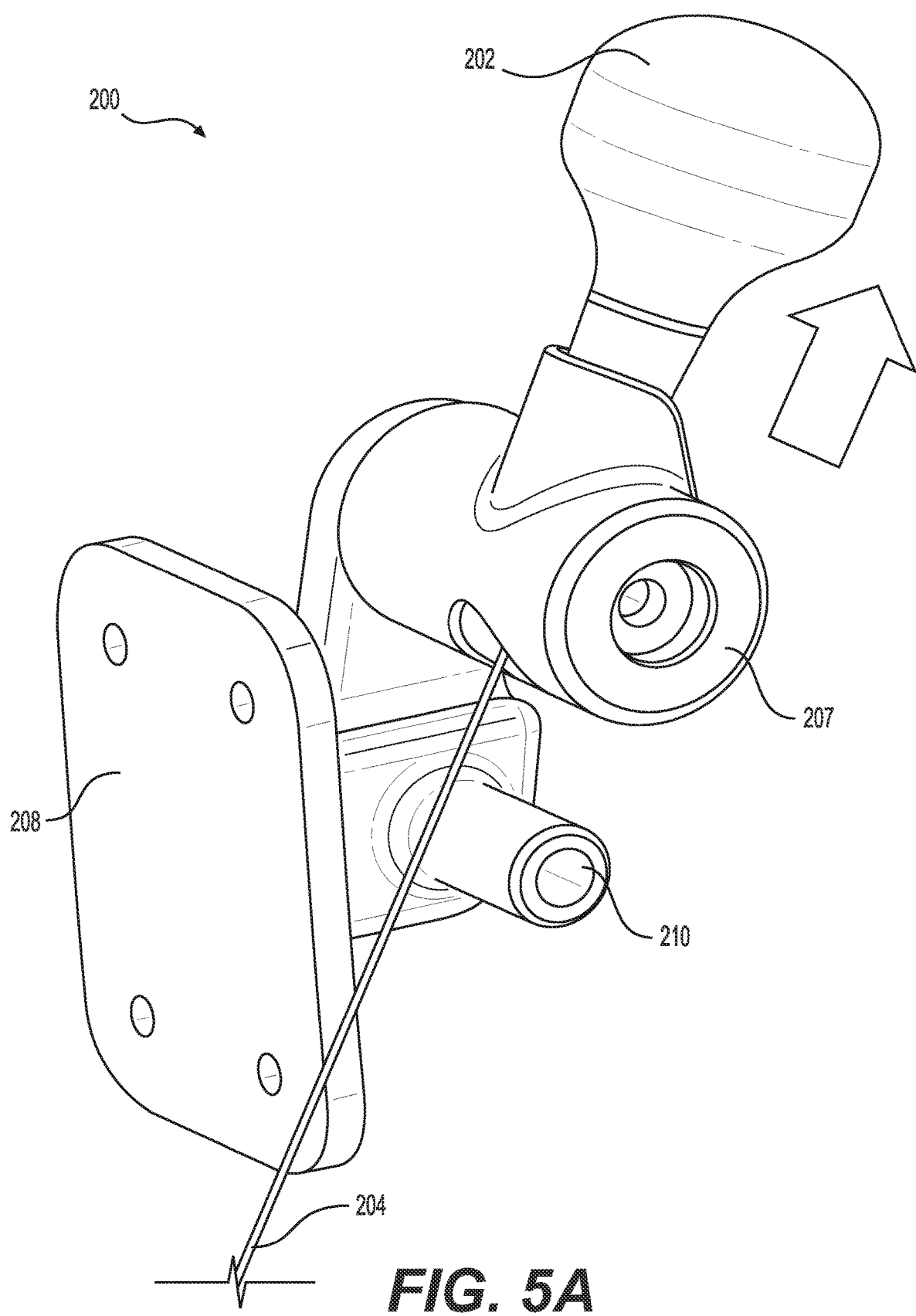
FIG. 5A-5B illustrate components of a reel mechanism of the bifold airstair of FIG. 1, in some embodiments.
Figure 5B:
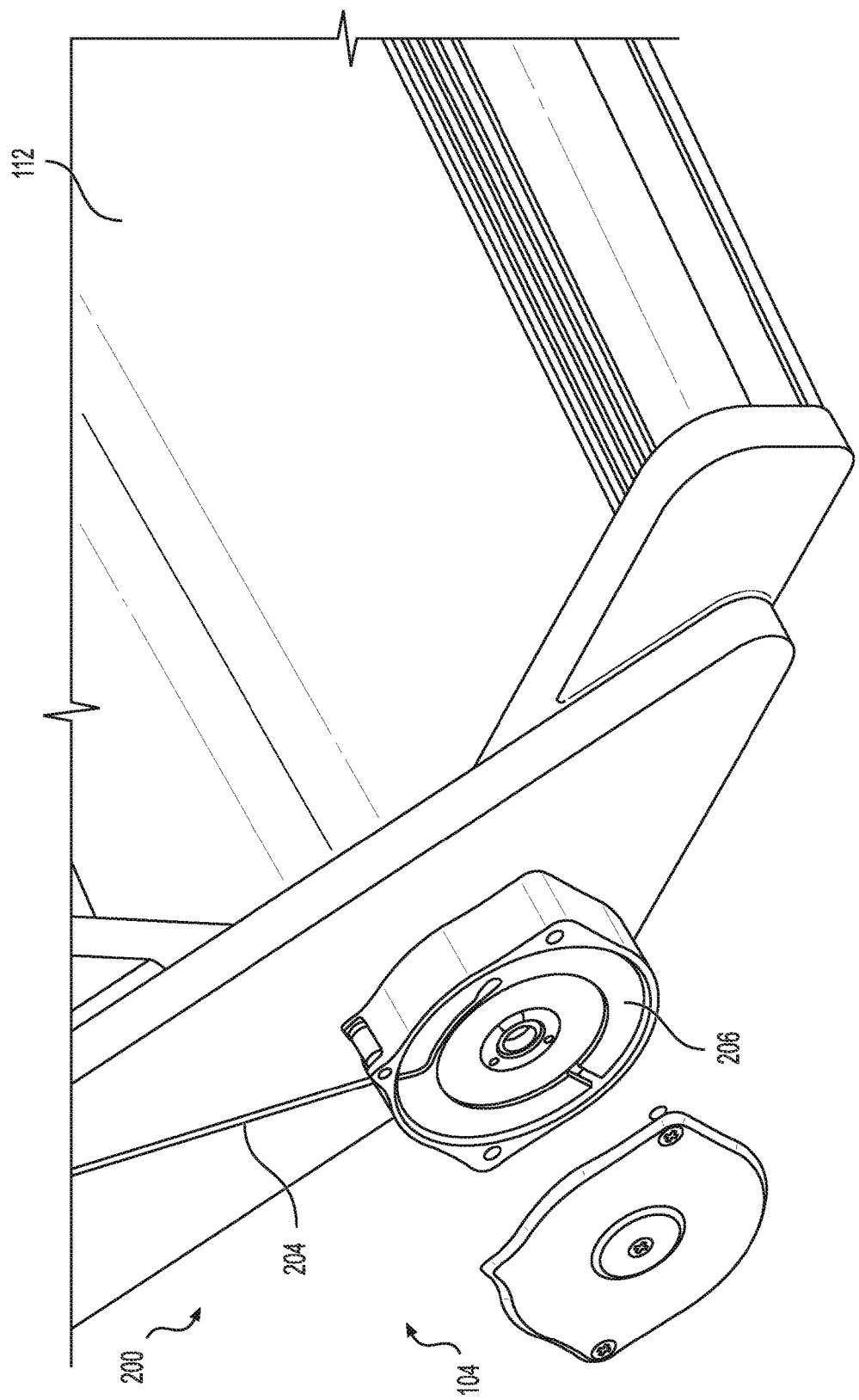

Turning now to FIGS. 5A-5B, components of reel mechanism 200 are illustrated. Reel mechanism 200 allows a passenger from within an aircraft to actuate the deployment of or stowing of bifold airstair 100. Reel mechanism 200 may include a knob 202 operatively connected to spool 206 via wire 204. In some embodiments, a portion of knob 202 is received by a knob housing 207 for when knob 202 is not in use. Knob housing 207 may be connected to a portion of the fuselage of an aircraft via plate 208. In these embodiments, knob housing 207 comprises a static configuration, in relation to knob 202 and wire 204 when actuated. Knob housing 207 may include a wire support 210 disposed thereon. Wire support 210 may be configured to provide a contact point for wire 204 to be supported on while a passenger actuates knob 202 and wire 204. Furthermore, wire support 210 may provide stability for wire 204 while being actuated. Wire 204 may be connected to knob 202 via a mechanism that allows for adjusting the length of wire 204 in relation to bifold airstair 100. For example, after many uses wire 204 may become partially stretched out compared to the original length of wire 204. As such, a user may desire to shorten wire 204 so there is no slack in reel mechanism 200. In these embodiments, a user may alter the length of wire 204 by adjusting its connection with knob 202. For example, the end of wire 204 may have a threaded coupling such that knob 202 can rotate about the threads to adjust its position relative to the end of wire 204.

Referring now to FIG. 5B, spool 206 is illustrated with a portion removed, showing spool 206 receiving a portion of wire 204. Spool 206 is disposed on a lower portion of second half 104. Spool 206 may be configured to retract slack in wire 204 when knob 202 is actuated in the direction of the arrow illustrated in FIG. 5A. For example, a user may actuate knob 202 in the direction of the arrow (i.e., inwards to the fuselage of an aircraft). Due to actuation, wire 204 will pull on spool 206, thereby lifting second half 104 of bifold airstair 100 upwards (i.e., towards the stowed configuration). Actuation of the second half 104, which will rotate around hinge 114, causes slack of wire 204 once tension is released by the user by, for example, stopping actuation of the knob 202 away from knob housing 207. To compensate for this, spool 206 may be configured to coil any slack that occurs in wire 204 while maintaining tension on wire 204. Accordingly, reel mechanism 200 may allow for stowing of bifold airstair 100 while not allowing loose parts of wire 204, thereby preventing wire 204 from snagging any other portions of bifold airstair 100 or components of the aircraft. In some embodiments, spool 206 comprises a biasing mechanism which biases wire 204 cylindrically around an axle. The biasing mechanism may be a spring, such as a clock spring. Clock springs, or power springs as they are sometimes called normally use a flat metal strip as a spring material. The band is tightly wound tightly would on an axle (here at the center of spool 206) and secured. The band when released offers a circular movement in the housing of spool 206, and provide torque. In alternative embodiments a torsion spring could be used.

FIG. 6 illustrates the underside of first half 102 while bifold airstair 100 is in the stowed configuration (i.e., vantage point of an onlooker outside of the aircraft). Depicted here is secondary damper 132, which may be operatively connected to portions of the first half 102 and second half 104. While bifold airstair 100 is depicted here as comprising one secondary damper 132, it is contemplated that bifold airstair 100 may comprise two or more secondary dampers 132. Secondary damper 132, in some embodiments, is configured to ease the deployment of bifold airstair 100 and aid in stowing bifold airstair 100. For example, secondary damper 132 may be biased in the extended configuration (i.e., as depicted in FIG. 6). Secondary damper 132 may be attached to a static portion of first half 102 on one end and fixed to a moveable portion of second half 104 on the other end. The attachment of the one end of secondary damper 132 to the first half 102 may be one of a shoulder joint type attachment. Accordingly, as bifold airstair 100 is deployed, secondary damper 132 may provide resistance against the rotation of second half 104 around hinge 114 by providing resistance to second half 104 against the static portion of first half 102. Said another way, since secondary damper 132 is biased in the extended configuration, weight from second half 104 will compress secondary damper 132, thereby causing resistance against second half 104 while being deployed. In another example, secondary damper 132 may aid in stowing of bifold airstair 100. For instance, as a user actuates bifold airstair 100 via the reel mechanism 200, secondary damper 132 may begin to extend, thereby biasing second half 104 around hinge 114 in the upwards direction (i.e., towards first half 102 and the stowed configuration). In some embodiments, secondary damper 132 may comprise a spring strut, gas strut, or hydraulic damper.

In some embodiments, bifold airstair 100 may be equipped with electrical wiring to, for example, illuminate lighting panels located on the plurality of stairs. For example, bifold airstair 100 may include a lighting panel on each stair (e.g., light-emitting diode panel) which may illuminate each stair. To provide electricity to the one or more light panels, bifold airstair 100 may have wiring secured to the underside of one or both of the first half 102 and second half 104 such that any wiring may be hidden from sight of an onlooker when bifold airstair 100 is in the deployed configuration (e.g., in FIG. 1). Such a lighting panel may provide a safety function in the case that a passenger is boarding or exiting the aircraft in a dark environment.

Magnetic Adjustable Securing System

Figure 7A:
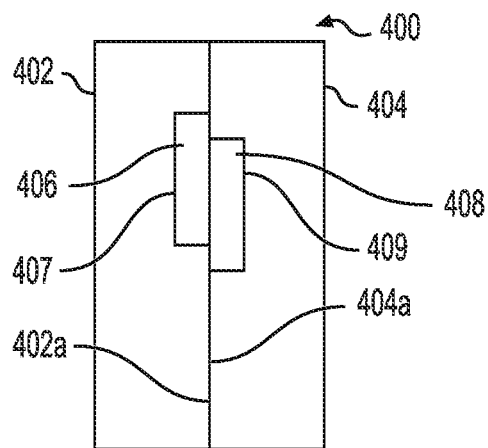
FIGS. 7A-7D show some embodiments of an adjustable securing mechanism.

An adjustable securing mechanism 400 is illustrated in FIGS. 7A-8D, in some embodiments. FIG. 7A depicts a side view of the adjustable securing mechanism 400. Adjustable securing mechanism 400 is configured to secure two objects, first object 402 and second object 404, together using one or more magnets. For example, as illustrated in FIG. 7A, adjustable securing mechanism 400 may include a first magnet 406 disposed on a first abutting face 402a of the first object 402 and a second magnet 408 disposed on a second abutting face 404a the second object 404. The magnets 406, 408, in the FIG. 7A embodiment being defined into receiving recesses 407 and 409 defined into each of the objects, may be disposed on the abutting faces 402a, 404a such that the magnets nearly or directly contact another when in a secured configuration. In some embodiments, the magnets 406, 408 may be disposed on the abutting faces 402a, 404a such that they are partially recessed within the first object 402 and second object 404, and as such do not contact one another. In some embodiments, the magnets 406, 408 may be partially covered on the abutting faces 402a, 404a by a non-interacting material (e.g., plastic) so as to cover the view of the magnets 406, 408 from the view of an onlooker.

As mentioned above, adjustable securing mechanism 400 may comprise more or less magnets than illustrated here. For example, adjustable securing mechanism 400 may include just a first magnet 406 which may be configured to attract a metallic portion disposed on second abutting face 404a of second object 404. In another example, there may be a third magnet and fourth magnet disposed on an abutting surface of first object 402 and second object 404. More or less magnets may be used in adjustable securing mechanism 400 depending on the force needed to secure first object 402 to second object 404. Additionally, magnets providing a transient attraction may be used to aid in transition between the unsecured and secured configurations. For example, an additional magnet may be disposed on first object 402 such that it is along the trajectory of (at a substantially similar displacement from the hinge point relative to) the second magnet 408 as the second object 404 is rotating towards first object 402 (i.e., towards the secured configuration). This additional magnet may transiently pull second magnet 408 towards it, providing an aided force to bring the two objects into the secured configuration. Additionally, the alternative may be true, such that while moving second object 404 out of the secured configuration, the additional magnet may provide an attractive force on second magnet 408 to help pull second object 404 out of the secured configuration. In some embodiments, the sizing of the one or more magnets may be adjusted to meet the required force to secure first object 402 to second object 404. In some embodiments, the shape of the one or more magnets may be adjusted to meet the required force to secure first object 402 to second object 404. Additionally, as will be described in greater detail below, the location of the one or more magnets on the abutting faces may be adjusted to meet the required force to secure first object 402 to second object 404.

Figure 7B:
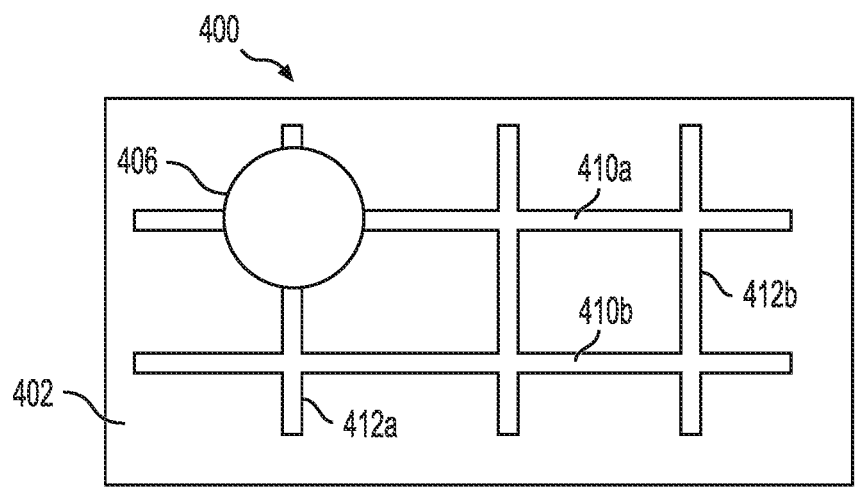
Figure 7C:
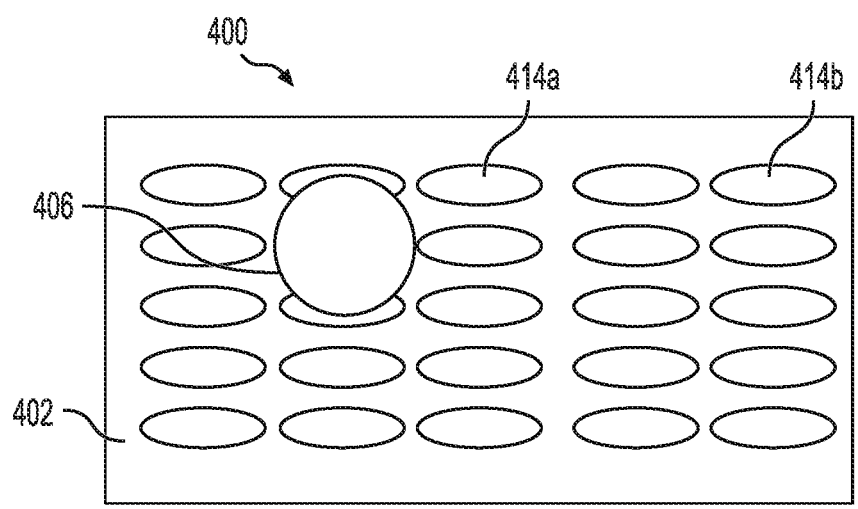
Figure 7D:
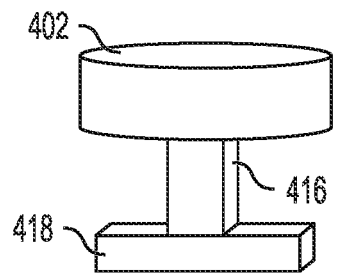

FIGS. 7B-7C illustrate different embodiments of adjustable securing mechanism 400. Specifically, FIGS. 7B-7C illustrate different ways in which the position of the one or more magnets 406, 408 may be adjusted on the abutting face 402a, 404a. For exemplary purposes, only first object 402 and first abutting face 402a are illustrated in FIGS. 7B-7C. However, it will be understood that similar adjustment options may be applied to second abutting face 404a of second object 404. As illustrated in FIG. 7B, first object 402 may comprise one or more horizontal pathways 410a, 410b as well as one or more vertical pathways 412a, 412b. Additionally, although not shown, it is contemplated that pathways may be placed in an axial direction (i.e., diagonal). The one or more pathways 410a, 410b, 412a, 412b may be configured to allow movement of first magnet 406 therein. For example, a user may adjust the vertical positioning of magnet 406 by moving it downwards along vertical pathway 412a. In these embodiments, magnet 406 may comprise a mechanism to keep it operatively attached to a position within the one or more pathways. For example, as shown in FIG. 7D, magnet 406 may be mechanically coupled to linker 416. The one or more pathways may be configured to receive a portion of or all of linker 416. Additionally, a fastening mechanism (e.g., rod 418) may be disposed at a distal end of linker 416 (i.e., opposing side of first abutting face 402a). Accordingly, the fastening mechanism may be configured to fasten the first magnet 406 at any location along the one or more pathways.

As illustrated in FIG. 7C, in some embodiments first object 402 may comprise one or more slots 414a, 414b. Slots 414a, 414b may be configured to receive a portion of first magnet 406 and secure first magnet 406 therein. Similar to the description above, in some embodiments, the shape of slot 414a, 414b is configured to receive a portion of first magnet 406 (e.g., rod 418). In these embodiments, slot 414a, 414b may comprise any shape other than a circle, such that rod 418 may be inserted and turned, fastening first magnet 406 thereto. For example, slot 414a, 414b may comprise an oval, rectangle, star, square, trapezoid, triangle, diamond, etc. In these embodiments, rod 418 may comprise a similar shape to slot 414a, 414b, such that it may be received therethrough but secured upon turning first magnet 406. For example, first magnet 406 may be rotated at a quarter turn, a third turn, a half turn, a three quarters turn, etc. to prevent rod 418 from exiting the slot 414a, 414b.

In other embodiments, slots 414a, 414b may comprise magnetic means by which one side of first magnet 406 may be attracted to. For example, a lower portion of slot 414a, 414b may comprise an additional magnet disposed therein. Accordingly, one side of first magnet 406 may attract and secure first magnet 406 thereto.

Other adjustable fastening mechanisms to fasten first magnet 406 to first abutting face 402a of first object 402 are contemplated. For example, first magnet 406 may be fastened to first abutting face 402a via one or more of snaps, Velcro®, suction, magnets, or any other commonly used fastening mechanism known to one skilled in the art. Furthermore, it is contemplated that the design of first object 402 may be readily altered to adjust the positioning of first magnet 406 therein. For example, with the recent availability of 3D printing technology, multiple iterations of first object 402 may be readily constructed so as to alter the position of first magnet 406 on first object 402.

Figure 8A:
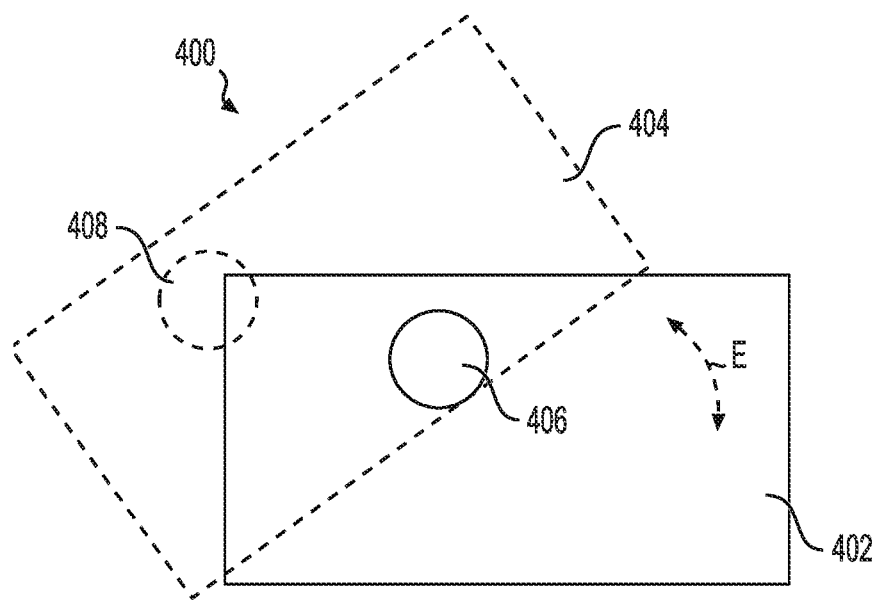
FIGS. 8A-8D show some embodiments of the adjustable securing mechanism.
Figure 8B:
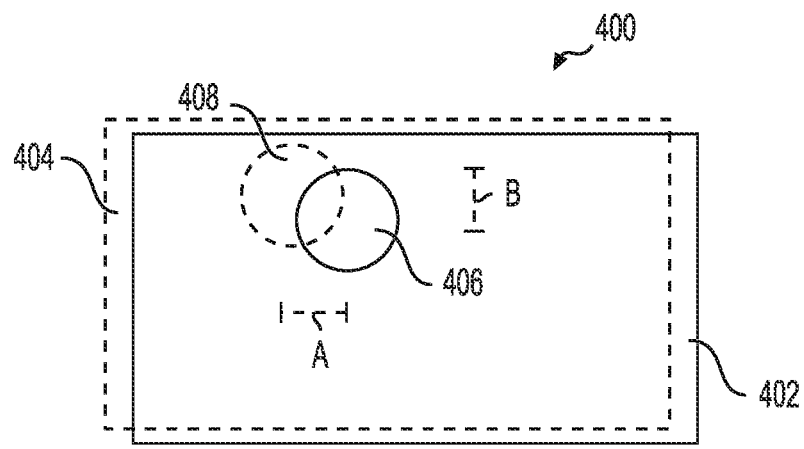

As depicted in FIGS. 8A-8B, adjustable securing mechanism 400 may be configured to secure two objects which come together at a rotational direction R. For example, FIG. 8A illustrates first object 402 and second object 404 in transition from an unsecured configuration to a secured configuration (shown in FIG. 8B). As can be seen, second object 404 is rotating towards first object 402 around rotational direction E. Placement of first magnet 406 on first object 402 and second magnet 408 on second object 404 may be such that attractive forces between first magnet 406 and second magnet 408 may begin to act on the objects at a defined location in the rotation (i.e., a specific distance between the magnets 406, 408 is reached). Accordingly, adjustable securing mechanism 400 may act as an additional aid in bringing first object 402 and second object 404 into the secured configuration.

As mentioned previously, and depicted in FIG. 8B, positioning of first magnet 406 and second magnet 408 may be configured such that each magnet does not directly overlap. For example, the two magnets 406, 408 may be offset by distance A and/or distance B. Such an offset may allow for a specific amount of force to be acquired between the two magnets. Such adjustments allow for a user or manufacturer to establish a specified force, wherein the force may act to relatively stabilize first object 402 and second object 404 in a secured configuration while not providing too much force such that a user may move first object 402 and second object 404 from a secured configuration to an unsecured configuration (i.e., movement from FIG. 8B to FIG. 8A). Such a shearing type of force must overcome the attractive forces of the first magnet 406 and second magnet 408.

In some embodiments, the positioning of one or more of the first magnet 406 and the second magnet 408 may be adjusted in relation to the hinge about which first object 402 and/or second object 404 rotate around (i.e., axis of rotation). For example, the first magnet 406 and the second magnet 408 may be moved away from the hinge to increase the force required to overcome the magnetic attraction and move the first object 402 and second object 404 from the secured configuration. Alternatively, in another example, the first magnet 406 and the second magnet 408 may be moved closer to the axis of rotation to decrease the force required to overcome the magnetic attraction and move the first object 402 and second object 404 from the secured configuration.

Figure 8C:
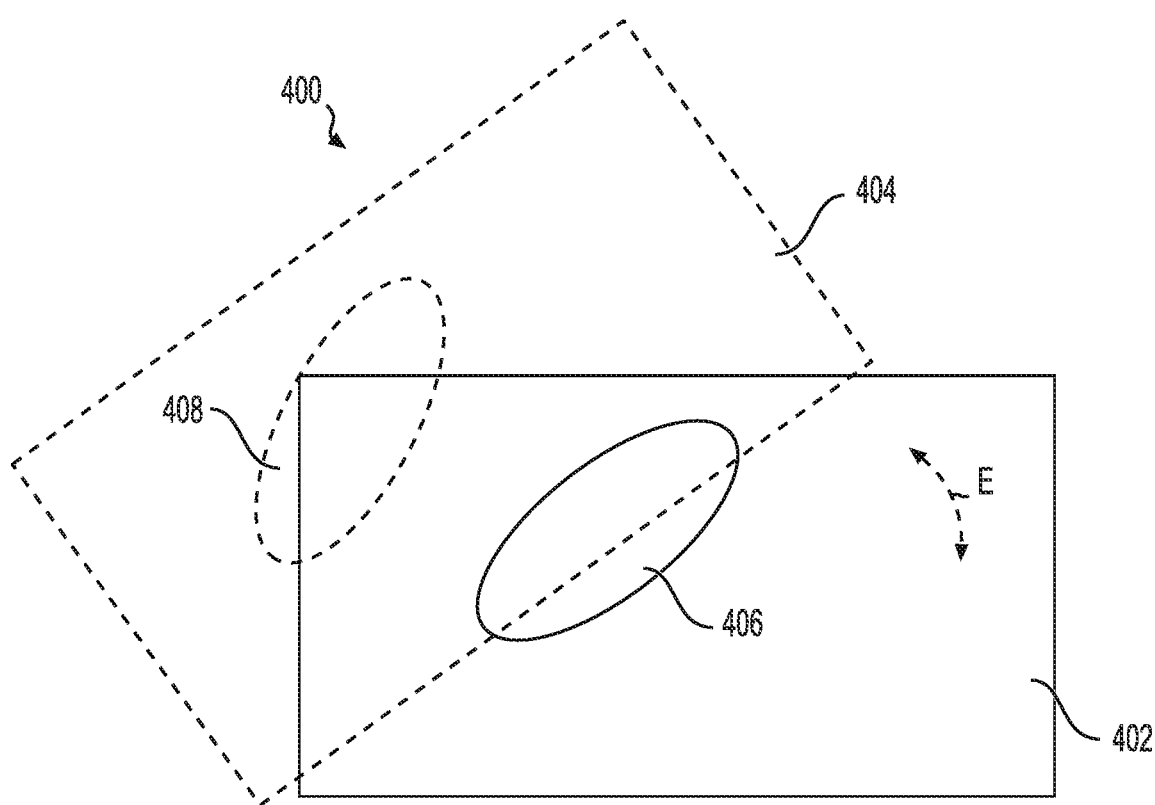
Figure 8D:
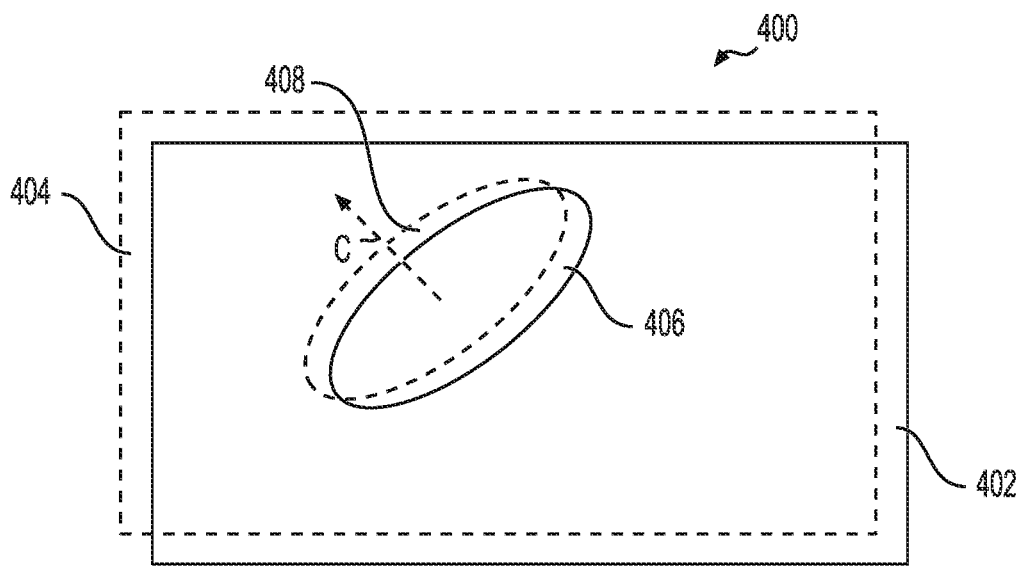

In addition to adjusting the relative positioning of the first magnet 406 to the second magnet 408, the shape of the magnet may be adjusted to affect the attractive forces of the first object 402 to the second object 404, as illustrated in FIGS. 8C-8D. For example, an elongated magnet shape may be advantageous in some embodiments. Such an elongated shape may create a more secure fit along the elongated axis while creating a less secure fit along the perpendicular axis, which may decrease the shearing force needed to move the objects from the secured configuration into the unsecured configuration. For example, depicted in FIG. 8D, the elongated magnets significantly overlap along the elongated axis, however a thinner overlap occurs in the direction of force vector C. Therefore, if a user, using shearing force, attempts to move the two objects into the unsecured configuration (i.e., from 8D to 8C), the shearing force needed to make this adjustment may be less than the shearing force needed to similarly move the objects as depicted in FIGS. 8A-8B. While an oval is shown as an elongated shape for first magnet 406 and second magnet 408 in FIGS. 8C-8D, it should be understood that any elongated shape of a magnet known to one skilled in the art may be used for associated purposes.

While the aforementioned examples illustrated in FIGS. 8A-8D show second object 404 rotating around while first object 402 remains static, it is contemplated that both objects 402, 404 may be rotatable. Furthermore, it is contemplated that second object 404 may remain substantially static while first object 402 remains substantially rotatable. The adjustable securing mechanism 400 may be useful for any situation in which two objects rotatable to one another need to be transiently secured in a secured configuration. For example, adjustable securing mechanism 400 may be used to secure objects on any type of vehicle (e.g., car, train, boat, aircraft, etc.). Such uses may be particularly advantageous on vehicles subjected to unexpected forces, such as turbulence in the case of aircraft or waves in the case of boats. Furthermore, adjustable securing mechanism 400 may be used on swinging items such as doors, cabinets, gates, etc. to aid in closing of said swinging items.

The use of adjustable securing mechanism 400 on objects rotatable to one another is advantageous compared to other magnetic securing mechanisms. For example, the shearing force to overcome the attractive forces of first magnet 406 and second magnet 408 may be less than if the magnets required decoupling in a plane directly parallel to the attractive forces. Said another way, pulling two magnets directly apart from one another requires a greater force than moving each magnet perpendicularly to the attractive force vectors (i.e., shearing).

Figure 9B:
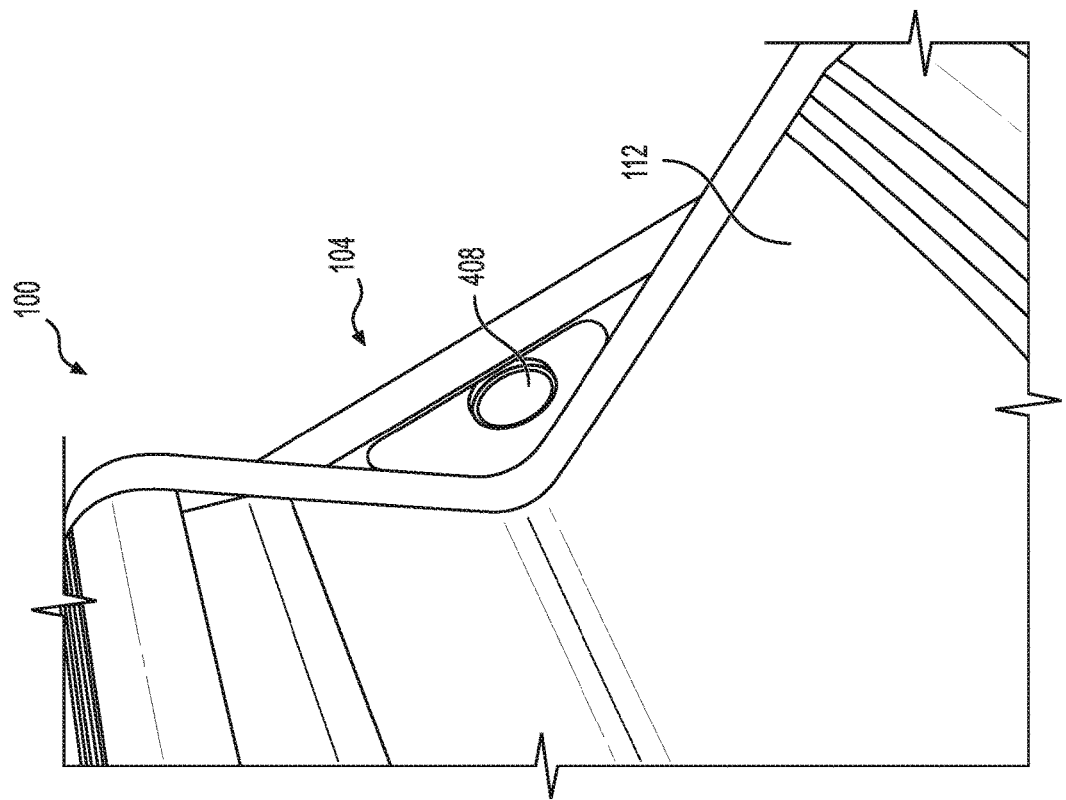
Figure 9A:
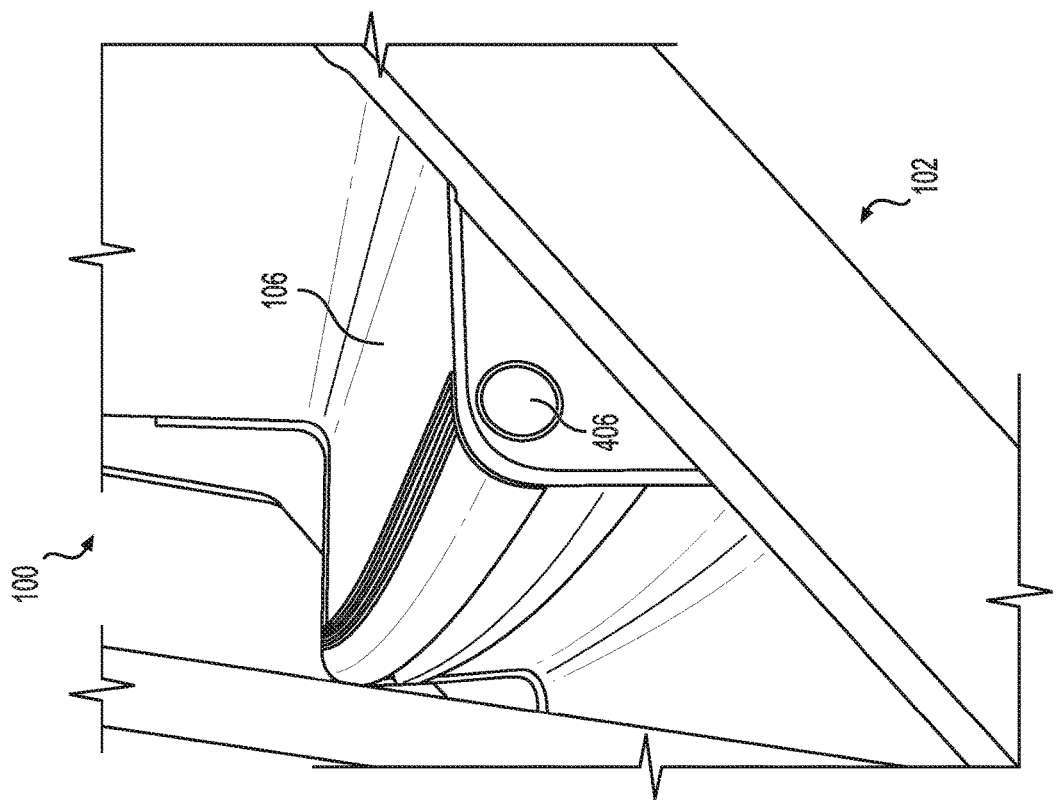

FIGS. 9A-9C illustrate the adjustable securing mechanism 400 disposed on bifold airstair 100, of which are best viewed together for the following description. Bifold airstair 100 may, in some embodiments, include adjustable securing mechanism 400 by which to secure the first half 102 and second half 104 together while in the stowed configuration. The adjustable securing mechanism 400 may, in embodiments, prevent first half 102 and second half 104 from banging against one another while the aircraft is performing flight-related functions (e.g., takeoff, cruising, landing, turbulence, etc.). Furthermore, the adjustable securing mechanism 400 may provide a safety feature of bifold airstair 100, as unhinging of the second half 104 from first half 102 during flight may be potentially hazardous for passengers onboard.

In some embodiments, the adjustable securing mechanism 400 may include a plurality of magnets located on portions of first half 102 and second half 104. Depicted in FIG. 9A, first magnet 406 is shown on the aft facing side of first stair 106. Note that first magnet 406 is directed outwardly from bifold airstair 100. Depicted in FIG. 9B, second magnet 408 is shown front facing side on the aft side of fourth stair 112. The orientation of magnets 406 and 408 is such that, upon bringing second half 104 up and against first half 102 (i.e., in the stowed configuration), the magnets 406, 408 may align along their attractive poles (e.g., as depicted in FIG. 9C). Accordingly, first magnet 406 and second magnet 408 may secure the second half 104 against the first half 102, thereby keeping bifold airstair 100 in the stowed configuration. In some embodiments, the force of attraction between first magnet 134a and second magnet 136a may be configured to maintain bifold airstair 100 secured, but not locked, in the stowed configuration. For example, the attractive force may be great enough to prevent second half 104 from coming unstowed during flight, but small enough for a user to deploy bifold airstair 100 by hand. In some embodiments, the attractive force between first magnet 406 and second magnet 408 may be adjusted by one or more of adjusting the size of the magnets, adjusting the force of the magnets, adjusting the size of the overlay space of the magnets, etc. It is further contemplated that bifold airstair 100 may include a mechanical latch to prevent second half 104 from coming unstowed for the safety of passengers on the aircraft. It is known by one skilled in the art that any mechanical latch, such as one required for aviation safety protocol, may be used.

Deployment/Stowing

Figure 10A:
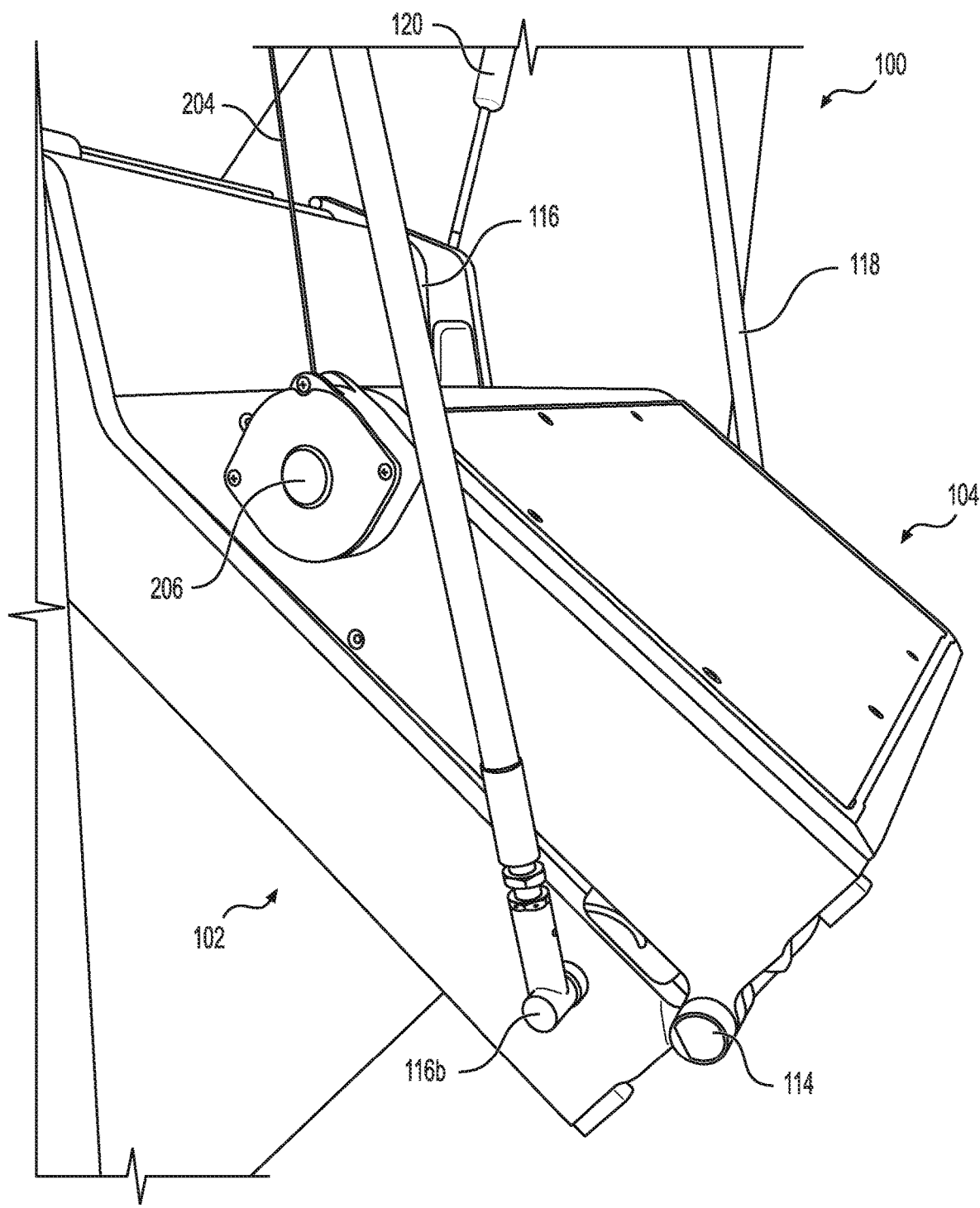
FIGS. 10A-10B illustrate a partially deployed/stowed configuration of the bifold airstair of FIG. 1, in some embodiments.
Figure 10B:
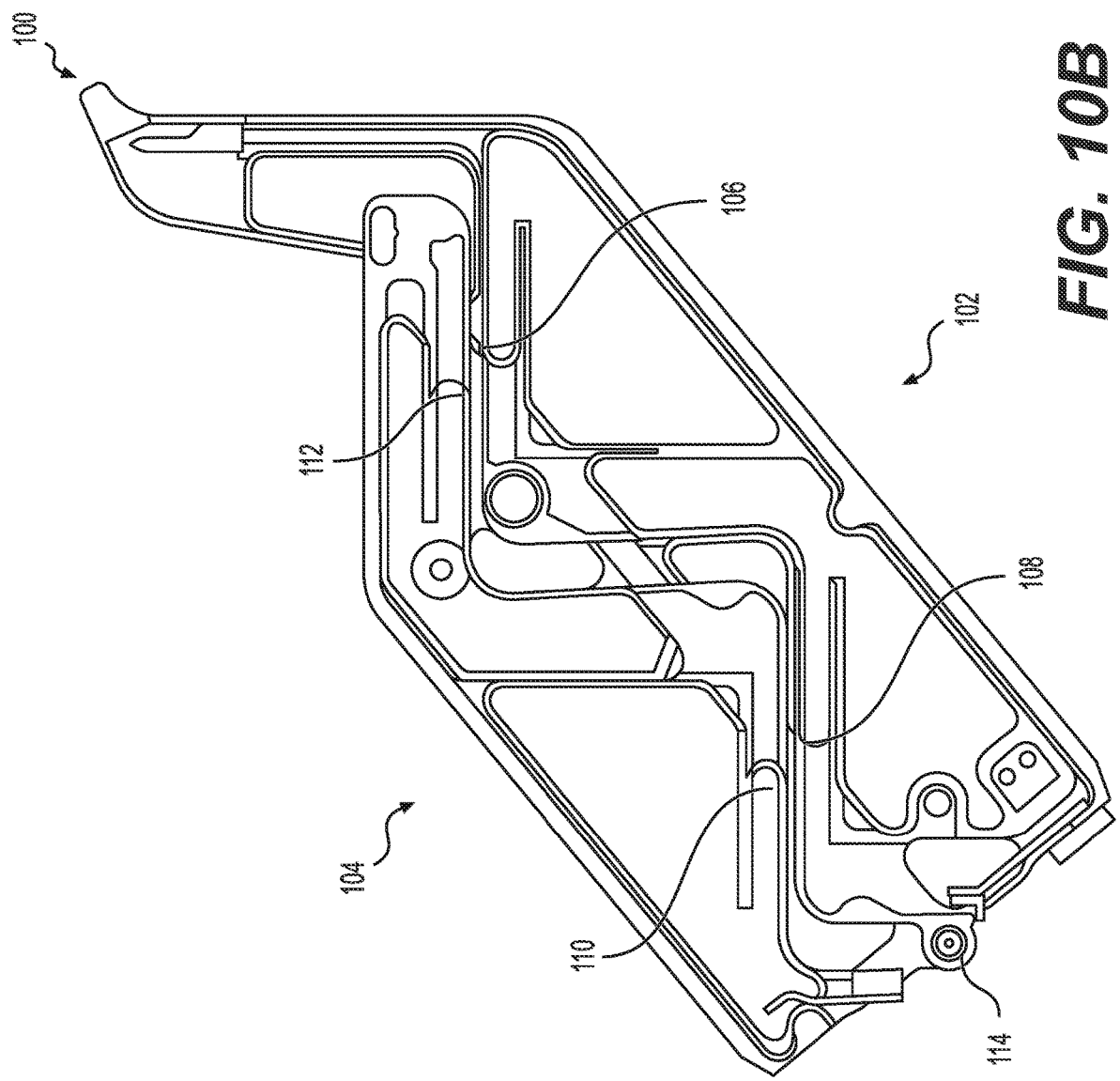

FIGS. 10A and 10B illustrate bifold airstair 100 in a partially deployed/stowed configuration, in some embodiments. FIGS. 10A and 10B illustrate the bifold airstair 100 midway between the deployed configuration and the stowed configuration. As such, during normal operation the bifold airstair 100 would not come to rest in these illustrated positions. FIG. 10A illustrates how second half 104 rotates upward to be received into the first half 102 to create overlap to form the partially deployed/stowed configuration depicted.

Bifold airstair 100 may be actuated into the partially deployed configuration via the following description. Bifold airstair 100 may be actuated outwardly from a stowed configuration (e.g., FIG. 11A-11B) via pulling on knob 202 thereby actuating wire 204 and spool 206, as described below. In some embodiments, force of the reel mechanism 200 may cause rotation of first half 102 around the center axis A' due to attachment points 138a and 138b (see FIG. 11A). During this rotation, the momentum of the first half 102 may cause primary damper 120 to extend. Since primary damper 120 is biased in a configuration to retract, it may provide resistance to the rotational force, therein easing the first half 102 into the partially deployed configuration illustrated in FIG. 10A. Additionally, once first half 102 has reached full rotation around center axis A', front cable 116 and aft cable 118 may be fully extended, such that the rotational force of first half 102 around center axis A' (see FIG. 11A) is halted due to the full extension of front cable 116 and aft cable 118. When fully deploying bifold airstair 100 (i.e., from depiction in FIG. 10A to depiction in FIG. 1), second half 104 may begin rotation around hinge 114. In some embodiments, rotation of second half 104 around hinge 114 may be eased by springs 126a and 126b, which are configured to bias against rotational force of second half 104 around hinge 114 in the outward, deployed direction. In some embodiments, rotation of second half 104 around hinge 114 may be eased by secondary damper 132. For example, secondary damper 132 may be biased in an extended configuration, wherein upon rotation of second half 104 it causes compression of secondary damper 132, which secondary damper 132 resists. The resistance of secondary damper 132 on second half 104 may, for example, prevent it from slamming open.

In another example, FIG. 10A depicts the bifold airstair 100 in the partially stowed configuration (i.e., moving from depiction in FIG. 1 to depiction in FIG. 10A). A user may initiate stowing of bifold airstair 100 by actuating knob 202 inwardly toward the aircraft (see arrow in FIG. 5A). Actuation of knob 202 may, through tension on wire 204, cause upwards rotation of second half 104 due to attachment of wire 204 to the second half 104 via spool 206. In some embodiments, upwards rotation of second half 104 around hinge 114 is aided by springs 126a and 126b. For example, springs 126a and 126b may bias second half 104 rotationally upwards around hinge 114, thereby assisting its rotation. In some embodiments, upwards rotation of second half 104 around hinge 114 is aided by secondary damper 132. For example, secondary damper 132 may be biased in the extended configuration, such that extension of secondary damper 132 may push second half 104 rotationally upwards around hinge 114 against first half 102.

Turning to FIG. 10B, bifold airstair 100 is depicted, in some embodiments, in the partially deployed/stowed configuration with the side partially transparent. FIG. 10B emphasizes how bifold airstair 100 is configured to be compactable when stowed, wherein first half 102 and second half 104 are nested together, therein minimizing the overall volume of the stowed stairway in the fuselage of the aircraft. For example, the upper surfaces of third stair 110 and fourth stair 112 may be configured, in some embodiments, to nearly abut against the upper surfaces of second stair 108 and first stair 106, respectively, when in the stowed configuration. Such a nested configuration minimizes the size of bifold airstair 100 when folded, which maximizes the available space in the fuselage, and additionally provides an aesthetic look for occupants of the aircraft or vehicle. Other components of each step may be configured to similarly fit together in a compact manner. As mentioned previously, while four steps are depicted here, it is contemplated that bifold airstair may comprise more or less stairs that similarly nest within one another to fit seamlessly together in the stowed configuration.

Figure 11A:
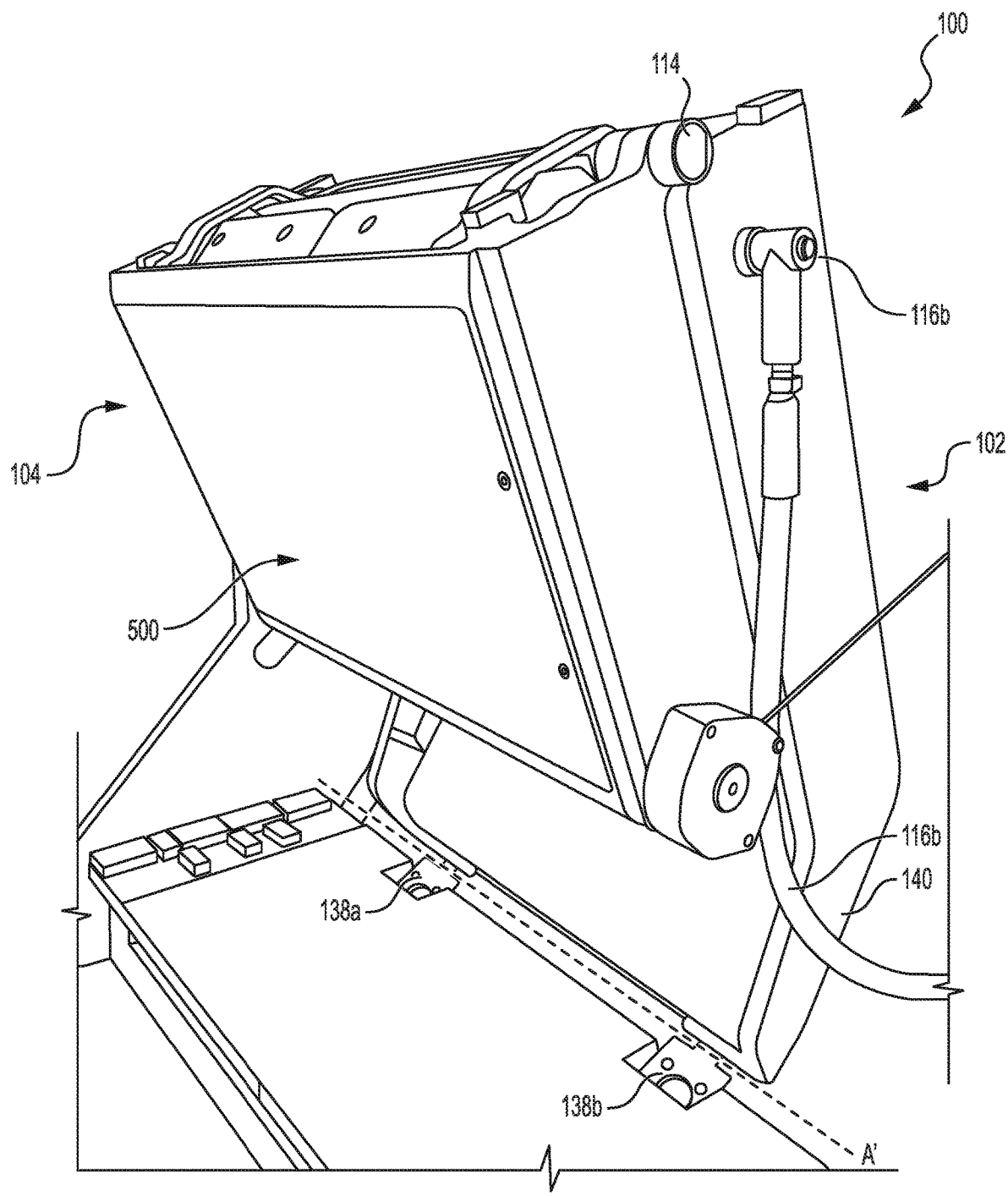
FIGS. 11A-11B show a fully stowed configuration of the bifold airstair of FIG. 1, in some embodiments.
Figure 11B:
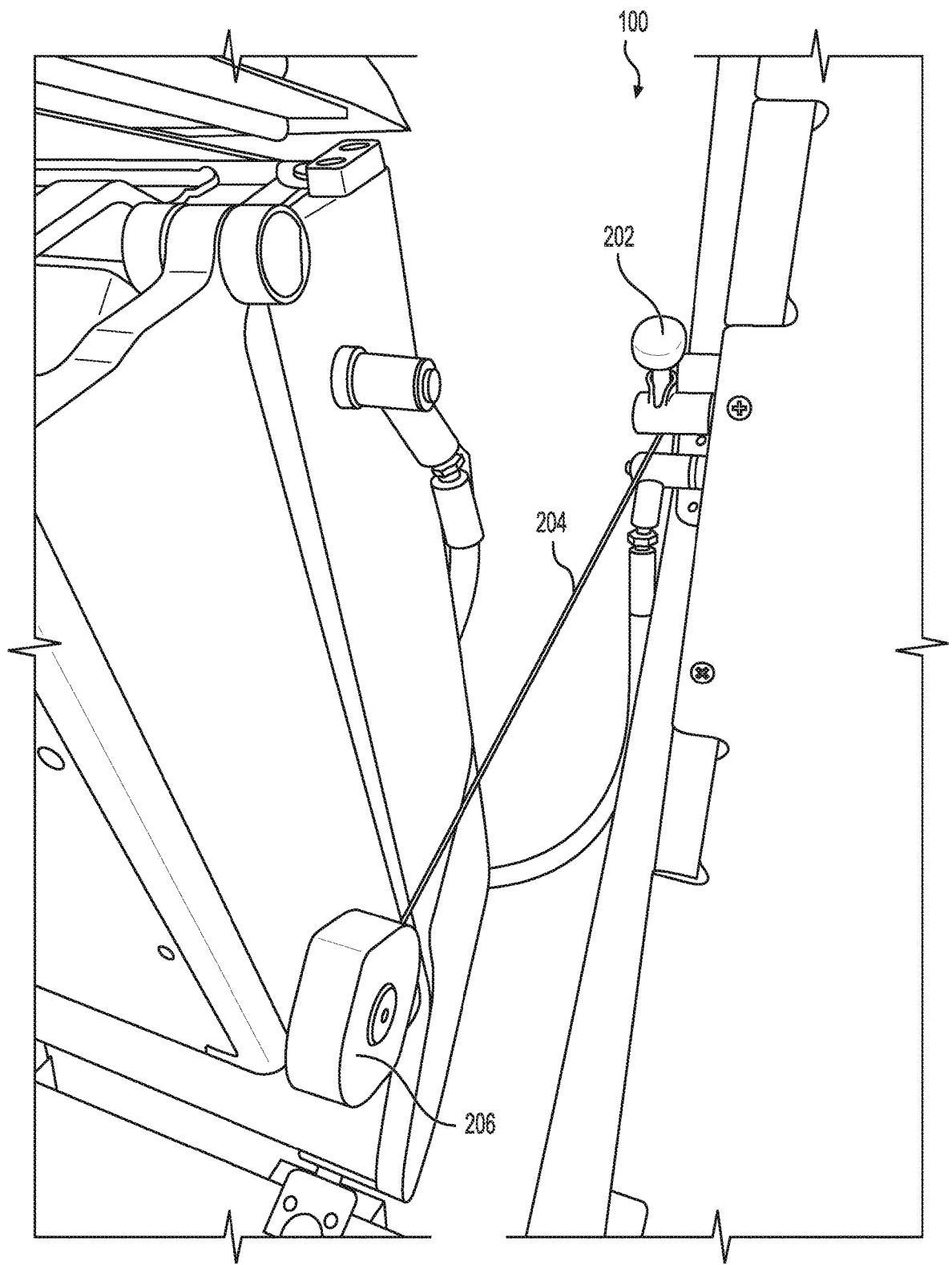

FIGS. 11A and 11B illustrate bifold airstair 100 in the stowed configuration. In the stowed configuration, bifold airstair 100 is fully rotated inboard around axis A' and is fully located within the fuselage of the aircraft. Also, bifold airstair 100 is rotated over center above axis A' such that bifold airstair 100 is tilted inwardly, which makes room for the aircraft door to be closed behind it. In operation, upon rotation into the partially stowed configuration, one or more of the primary damper 120, the secondary damper 132, and/or springs 126a, 126b, may cause bifold airstair 100 to further rotate around axis A' from the partially stowed configuration depicted in FIG. 10A. In some embodiments, rotation of bifold airstair 100 around axis A' is due to attachment points 138a and 138b, which operatively attach the first half 102 to the aircraft. In some embodiments, attachment points 138a, 138b are configured to move in accordance with the plane of bifold airstair 100. In an example, when a user continues to actuate knob 202 after the bifold airstair 100 is in the partially stowed configuration (i.e., FIG. 10A), the first half 102 may begin to rotate around axis A' due to being attached to the aircraft at attachment points 138a, 138b. In some embodiments, this rotation may be assisted by primary damper 120. For example, primary damper 120 may be biased in the compressed configuration. As such, primary damper 120 may pull on first half 102 around axis A', thereby aiding in stowing the bifold airstair 100.

In another example, bifold airstair 100 may be moved from the stowed configuration depicted in FIGS. 11A and 11B to the partially deployed configuration depicted in FIG. 10A. In some embodiments, a user within the aircraft may actuate knob 202 of reel mechanism 200 while the bifold airstair 100 is in the stowed configuration. As best illustrated in FIG. 11B, in the stowed configuration, knob 202 is located more externally than spool 206, which is located on second half 104. As such, actuation of knob 202 similarly to what is illustrated in FIG. 5A, will pull on spool 206 via wire 204 in the outward direction. In some embodiments, this motion may cause bifold airstair 100 to rotate outwardly from the stowed configuration, therein commencing the deployment of bifold airstair 100. In some embodiments, once deployment is commenced, primary damper 120 may ease the lowering of first half 102 around axis A' as it is biased in the compressed configuration.

As illustrated, bifold airstair 100 may be configured to fit into the fuselage of an aircraft. For example, axial wall 140, located on the underside of first half 102, may comprise an angled shape so as to fit the contours of an aircraft (i.e., rounded lower wall). Additionally, in some embodiments, in the stowed configuration (i.e., FIG. 11A), the underside of first half 102 may be angled slightly inwards so as to fit the contours of the aircraft fuselage.

Tray Table Assembly

In some embodiments, the back side of second half 104, in the stowed configuration, may be configured to provide useful accessories to passengers onboard the aircraft. For example, second half 104 may comprise storage space, one or more cup holders, one or more charging ports (e.g., USB charger, wireless charging pad, two or three prong outlet, etc.), a worktable, a screen, one or more holders for a personal electronic device, etc. that may be of use to a passenger seated onboard the aircraft facing the stowed bifold airstair 100.

In some embodiments, the back side of second half 104 comprises a tray table assembly 500. Tray table assembly 500, may provide a flat workspace for a passenger onboard the aircraft to use. For example, the aircraft may be designed such that a chair or chairs face the bifold airstair 100 in its stowed configuration, as illustrated in FIG. 12A. Tray table assembly 500 includes a worktable 502. In some embodiments, the tray table assembly 500 further includes a storage compartment 504, which is blocked by worktable 502 when in the closed configuration. Storage compartment 504 may comprise an open space located internally to second half 104. Tray table assembly 500 further comprises pivot points 508a, 508b by which worktable 502 rotates around. Additionally, in some embodiments, tray table assembly may further comprise a release button 506. Release button 506 may be configured to release the worktable 502 from the closed configuration.

Figure 12B:
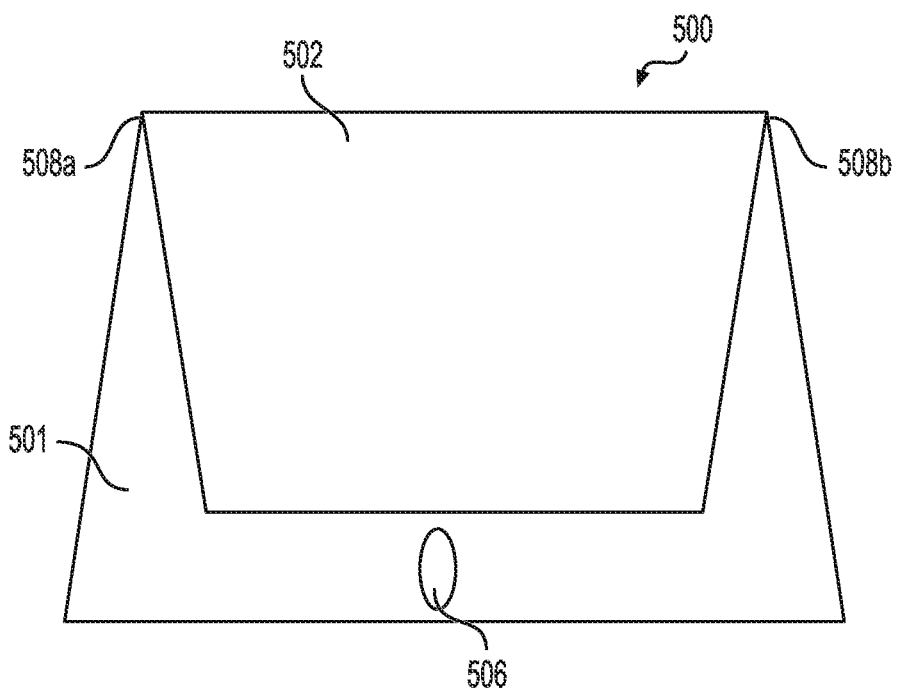

While tray table assembly 500 is depicted in FIG. 12A as a portion of bifold airstair 100, tray table assembly 500 may be configured to extend from any portion of the interior of an aircraft. For example, as illustrated in FIGS. 12B-12G, tray table assembly 500 may extend from structure 501. Structure 501 may comprise one or more of a wall or portion of a galley, a wall or portion of a bathroom, a mobile cart, an airstair, a chair, a wall in the fuselage, an area in the cockpit, etc. By including tray table assembly 500 throughout the interior of an aircraft, it would allow for more space to move about the fuselage while also allowing a user to access a tray table as needed (e.g., assembling food, baby diaper changing table, workspace, etc.).

Figure 12C:
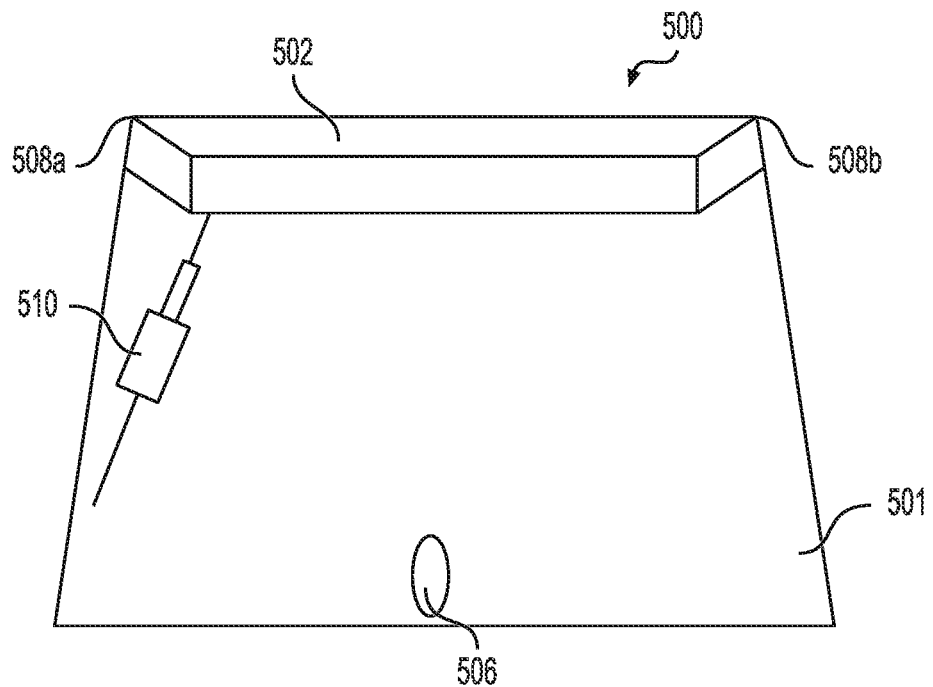

Tray table assembly 500 may comprise different embodiments for opening and closing mechanisms, illustrated in FIGS. 12B-12G herein. FIG. 12C illustrates one embodiment in which tray table assembly 500 includes actuating cylinder 510. In this embodiment, actuating cylinder 510 may bias worktable 502 in the upwards direction. As such, actuating cylinder 510 may be an extending cylinder such as a gas strut, a spring strut, hydraulic cylinder, etc. In some embodiments, release button 506 may be operatively linked to a locking mechanism the engages a portion of worktable 502. As such, the locking mechanism may maintain the worktable 502 in a closed configuration until a user actuates release button 506. Upon actuation of release button 506, actuating cylinder 510 may expand, biasing worktable 502 upwards around pivot points 508a and 508b. In some embodiments, actuating cylinder 510 may comprise a locking mechanism, wherein upon full extension, actuating cylinder 510 may lock. Accordingly, worktable 502 may be kept in the open configuration until a user releases the locking mechanism on the actuating cylinder 510. While tray table assembly 500 is depicted comprising one actuating cylinder 510, it is noted that tray table assembly 500 may comprise two or more actuating cylinders 510 to bias worktable 502 into the open configuration.

Figure 12D:
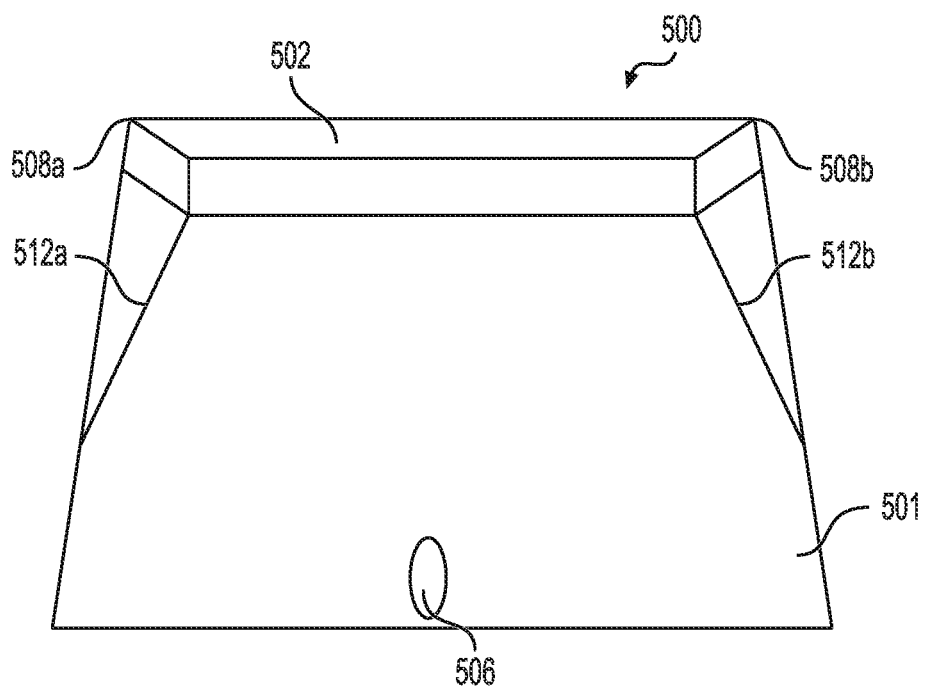
Figure 12E:
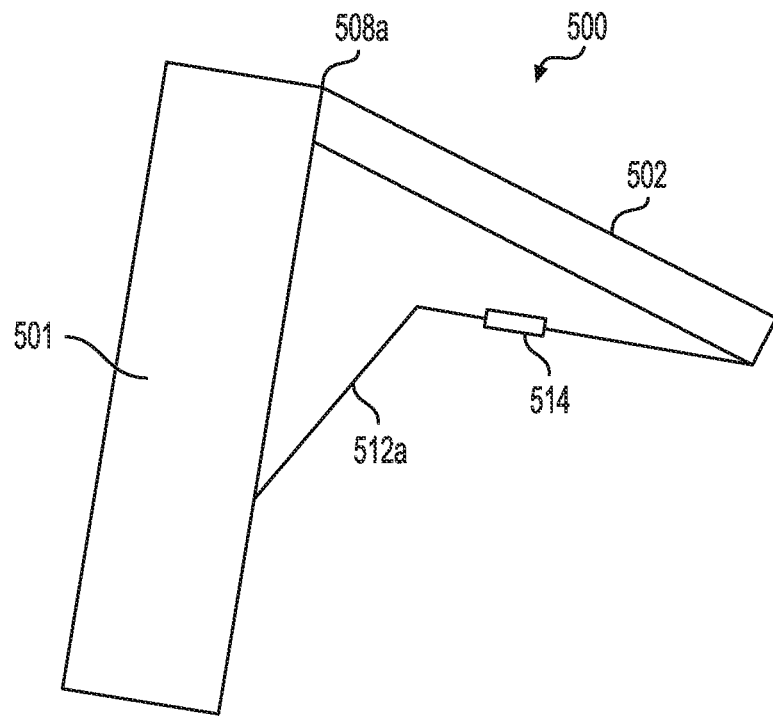
Figure 12F:
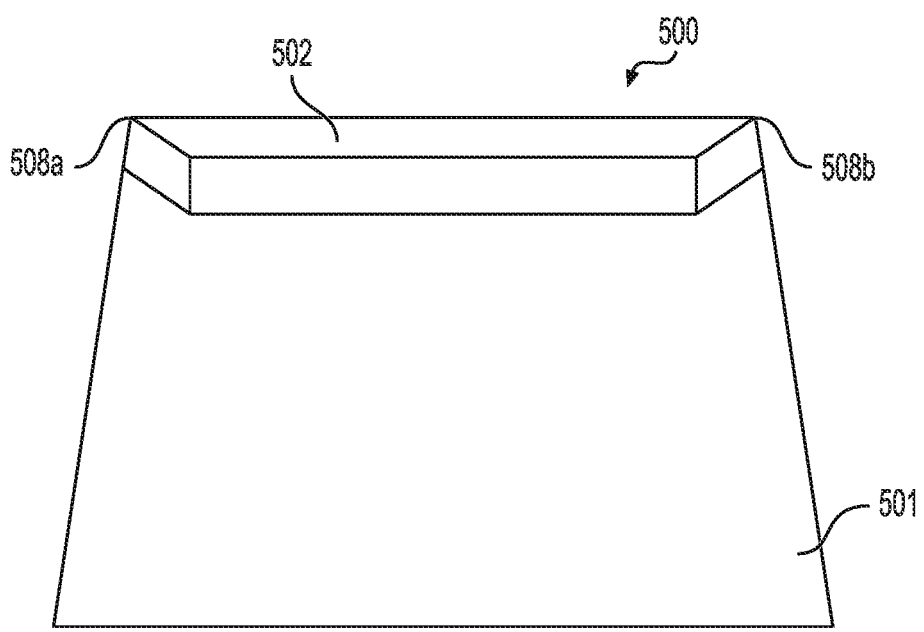
Figure 12G:
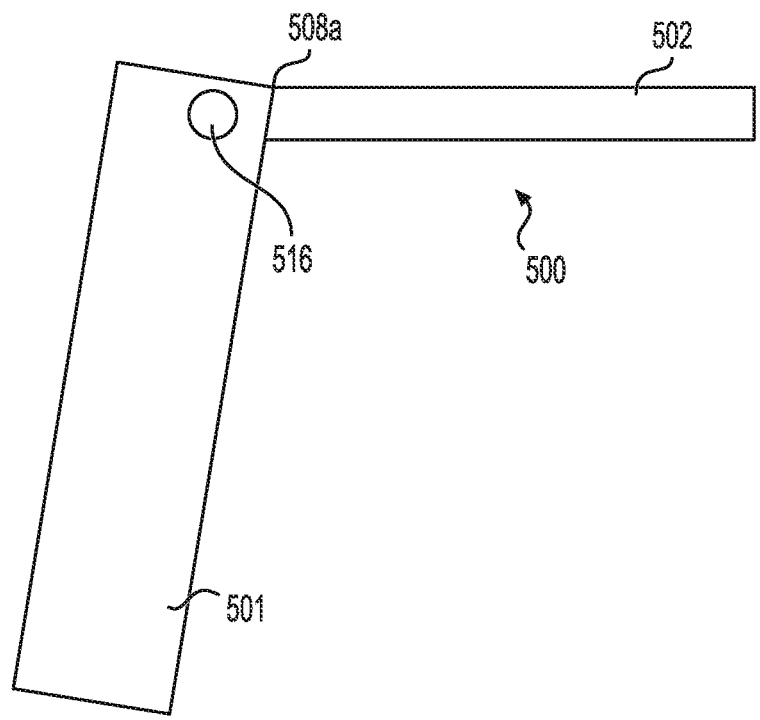

In some embodiments, such as those depicted in FIGS. 12D-12E, tray table assembly 500 may comprise supports 512a, 512b. As shown in FIG. 12D, supports 512a, 512b may operatively connect the proximal end of worktable 502 to the face of structure 501. In some embodiments, a user may manually lift worktable 502 into the open configuration. In some embodiments, an actuating mechanism such as those described with reference to FIG. 12C, 12F, or 12G are incorporated into tray table assembly 500 to bias the worktable 502 into the open configuration. As illustrated in the side view of tray table assembly 500 in FIG. 12E, supports 512a, 512b may be divided into two portions operatively linked in the middle such that the two portions fold inwardly when tray table assembly 500 is in the closed configuration. Supports 512a, 512b may further include sliding lock 514. Sliding lock 514 may comprise a fully encasing article that surrounds supports 512a, 512b. Accordingly, once tray table assembly 500 is in the open configuration, sliding lock 514 may be placed over the connection point between the two portions of supports 512a, 512b, therein locking the supports 512a, 512b in the extended configuration. To then place tray table assembly 500 into the closed configuration, a user may slide the sliding lock 514 out of position, allowing the convergence point of the two portions of supports 512a, 512b to fold upwards allowing worktable 502 to move to a closed configuration.

In some embodiments, such as those depicted in FIGS. 12F-12G, tray table assembly 500 may comprise internally biasing mechanisms that operate to bias worktable 502 into the open configuration. For example, mechanisms such as a torsional spring, such as springs 126a and 126b of FIG. 3B, may bias the worktable 502 towards the open configuration around pivot points 508a, 508b. The internally located mechanisms may also include a locking mechanism by which to lock worktable 502 in either the open configuration or the closed configuration. For example, tray table assembly 500 may include operating button 516. Operating button 516 may mechanically engage a rotatably locking mechanism that keeps worktable 502 in the open configuration or the closed configuration unless operating button 516 is actuated. Such a rotatably locking mechanism may include a pin biased towards a set of holes (e.g., one hole for the open configuration and one hole for the closed configuration). The pin may be biased by a spring, for example. When pin is inserted into one of the holes, the worktable 502 is maintained at that location (i.e., open configuration or closed configuration). Upon actuation of operating button 516, the pin may be released from the hole, therein allowing adjustment of worktable 502 between configurations. In these embodiments, pressure on worktable 502 may be required to move the worktable 502 to a closed configuration.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system configured to prevent abrupt collapse of a first structure against a second structure around a rotational axis comprising:
    a bumper having an at least partially flexible body;
    the body having a base portion attached to the first structure;
    the body having a linking portion rising up from a rear of the base portion;
    the body having a lever portion extending forwardly from the linking portion;
    a gap disposed between an underside of the lever portion and the base portion, the gap being configured to at least partially close upon a contact received from the second structure onto an upper surface of the lever portion;
    wherein the rotational axis is established by a hinge between the first and second structures and the bumper is attached to the first structure at a location proximate the hinge in an area onto which the second structure would otherwise impact; and
    wherein the first and second structures are independent portions of a foldable stairway.

2. The system of claim 1 comprising:
    an upper surface atop the base portion which together with the undersurface of the lever portion creates an engagement profile that becomes larger upon the abrupt collapse of the first and second structures.

3. The system of claim 2 wherein the upper surface atop the base portion is arcuate.

4. The system of claim 3 wherein the lever portion extends forward from the linking portion towards a free end towards a mouth defined between the lever portion and the linking portion.

5. The system of claim 4 wherein the engagement profile is configured to create a gradually-increasing angular resistance which prevents the abrupt impact between the first and second structures.

6. The system of claim 1 wherein the foldable stairway exists in a doorway of an aircraft.

7. The system of claim 6 comprising an additional symmetrical bumper is mounted on an opposite side of the stairway from the bumper and is oriented in a substantially symmetrical manner.

8. The system of claim 6 wherein the first structure is an upper portion of the stairway having a first set of steps on a side of the upper portion and the second structure is a lower portion of the stairway having a second set of steps on a side of the lower portion, the side of the lower portion including a second set of steps being rotatable upward to collapse onto the side of the upper portion.

9. The system of claim 1 wherein the base portion is connected to the first structure using a chemical adhesive.

10. The system of claim 1 wherein the height of the linkage portion is configured based on a weight of the second structure.

11. The system of claim 1 wherein the height of the linkage portion is configured based on a rotational force generated by a collapse of the second structure against the first structure.

12. The system of claim 1 wherein an angling of the lever portion relative to the base is configured to create a desired level of deceleration upon an engagement between the second structure and an upper surface of the lever portion.

13. The system of claim 1 wherein the body is configured such that the gap disposed between the underside of the lever portion and the base portion is configured to greatly decelerate the second structure when the gap is substantially closed upon a contact received from the second structure onto an upper surface of the lever portion.

14. The system of claim 1 wherein the lever portion includes downwardly-extending upper lip atop a mouth that is established between a forward end of the lever portion and a forward end of the base.

15. The system of claim 1 wherein an eye having a substantially rounded shape is established between the lever portion, the linking portion, and a rear of the base portion.

16. The system of claim 15 wherein the eye establishes an approximate hinge axis for the lever portion relative to the base portion.

17. The system of claim 1 wherein an arcuate shape of the upper surface of the base is configured to engage the arcuate shape of an internal roof surface underneath the lever, and that a radius of curvature of the upper surface of the base cooperates with the internal roof surface of the lever portion creating gradually increasing resistance force against a force applied by the second structure.

18. The system of claim 1 wherein the body is made of an elastomeric composition.

* * * * *